(12) United States Patent
Lück et al.

(10) Patent No.: US 8,421,277 B2
(45) Date of Patent: Apr. 16, 2013

(54) SWITCHED MODE POWER SUPPLY FOR AN ELECTRONIC DEVICE WITH AUXILIARY POWER FOR POWERING AN EVALUATION UNIT DURING AN ENERGY-SAVING STATE

(75) Inventors: Thomas Lück, Augsburg (DE);
Bert-Ingo Polczynski, Friedberg (DE);
Erwin Bässler, Königsbrunn (DE)

(73) Assignee: Fujitsu Siemens Computers GmbH, Munich (DE)

( * ) Notice: Subject to any disclaimer, the term of this patent is extended or adjusted under 35 U.S.C. 154(b) by 155 days.

(21) Appl. No.: 12/264,011

(22) Filed: Nov. 3, 2008

(65) Prior Publication Data
US 2009/0200871 A1   Aug. 13, 2009

(30) Foreign Application Priority Data
Nov. 2, 2007 (DE) .......... 10 2007 052 881

(51) Int. Cl.
*G06F 1/26* (2006.01)
*G06F 1/32* (2006.01)

(52) U.S. Cl.
USPC .......................................... 307/140

(58) Field of Classification Search .......... 307/140
See application file for complete search history.

(56) References Cited

U.S. PATENT DOCUMENTS 5,483,464 A * 1/1996 Song .................. 713/300
5,515,257 A * 5/1996 Ishii .................. 363/21.1
5,548,763 A * 8/1996 Combs et al. .......... 713/323

(Continued)

FOREIGN PATENT DOCUMENTS

EP 0 678 843 10/1995
EP 0 875 983 11/1998

(Continued)

OTHER PUBLICATIONS

Kuphaldt, Tony R., "Lessons in Electric Circuits", vol. III—Semiconductors I (NPN transistor), Fifth Edition, Jul. 2, 2007.

(Continued)

*Primary Examiner* — Adi Amrany
(74) *Attorney, Agent, or Firm* — Cozen O'Connor

(57) ABSTRACT

An electronic device (1), which can assume an operating state and at least one energy-saving state, with a power supply (7) that can be connected to a mains voltage, and an evaluation unit (4), which can control the electronic device (1) from the operating state into the energy-saving state and vice versa, wherein the evaluation unit (4) is connected to the power supply (7) in such a way that the power supply (7) can be turned off by the evaluation unit (4) for assuming the energy-saving state and can be turned on again for assuming the operating state, and the evaluation unit (4) can be supplied, at least in the turned-off state of the power supply (7), with energy from another electronic device, which is connected via a standard interface to the electronic device, and/or with energy from a capacitor and/or with energy from an accumulator and/or with energy from a solar cell. The invention also relates to the method for controlling the electronic device in at least one energy-saving state and also to a computer and also to an arrangement made from a computer and the electronic device.

9 Claims, 18 Drawing Sheets

U.S. PATENT DOCUMENTS

| | | | | |
|---|---|---|---|---|
| 5,616,988 A | * | 4/1997 | Kim | 315/1 |
| 5,648,799 A | * | 7/1997 | Kikinis | 345/212 |
| 5,659,371 A | * | 8/1997 | Krause | 348/730 |
| 5,774,116 A | * | 6/1998 | Potsch | 345/211 |
| 5,870,086 A | * | 2/1999 | Bang | 345/212 |
| 5,917,479 A | * | 6/1999 | Haapakoski | 345/211 |
| 5,938,770 A | * | 8/1999 | Kim | 713/300 |
| 5,944,830 A | * | 8/1999 | Hong et al. | 713/324 |
| 5,961,647 A | * | 10/1999 | Kim et al. | 713/300 |
| 6,052,291 A | | 4/2000 | Suzuki et al. | |
| 6,097,378 A | * | 8/2000 | Song | 345/211 |
| 6,107,698 A | * | 8/2000 | Ochiai et al. | 307/43 |
| 6,119,225 A | * | 9/2000 | Kim | 713/1 |
| 6,125,449 A | * | 9/2000 | Taylor et al. | 713/310 |
| 6,225,709 B1 | | 5/2001 | Nakajima | 307/66 |
| 6,232,964 B1 | * | 5/2001 | Lee | 345/212 |
| 6,259,172 B1 | * | 7/2001 | Lee | 307/125 |
| 6,275,221 B1 | * | 8/2001 | Song | 345/211 |
| 6,275,946 B1 | * | 8/2001 | Meir | 713/300 |
| 6,321,340 B1 | | 11/2001 | Shin et al. | |
| 6,345,364 B1 | * | 2/2002 | Lee | 713/324 |
| 6,363,491 B1 | | 3/2002 | Endo | |
| 6,369,552 B2 | * | 4/2002 | Goyhenetche et al. | 323/266 |
| 6,404,423 B1 | * | 6/2002 | Kivela et al. | 345/212 |
| 6,462,437 B1 | * | 10/2002 | Marmaropoulos et al. | 307/125 |
| 6,469,479 B2 | * | 10/2002 | Kim | 323/267 |
| 6,473,078 B1 | * | 10/2002 | Ikonen et al. | 345/211 |
| 6,480,400 B2 | * | 11/2002 | Wu et al. | 363/21.01 |
| 6,496,390 B2 | * | 12/2002 | Yang | 363/21.07 |
| 6,515,716 B1 | * | 2/2003 | Suzuki et al. | 348/730 |
| 6,590,597 B1 | * | 7/2003 | Kim | 715/866 |
| 6,697,941 B2 | * | 2/2004 | Kahler et al. | 713/100 |
| 6,769,070 B1 | | 7/2004 | Kawata | |
| 6,800,961 B2 | * | 10/2004 | Basso | 307/43 |
| 6,804,724 B2 | * | 10/2004 | Shin | 710/2 |
| 6,975,523 B2 | * | 12/2005 | Kim et al. | 363/56.11 |
| 7,000,127 B2 | * | 2/2006 | D'Alessio | 713/320 |
| 7,116,322 B2 | * | 10/2006 | Ko et al. | 345/211 |
| 7,173,613 B2 | * | 2/2007 | Greenwood et al. | 345/211 |
| 7,219,240 B2 | * | 5/2007 | O | 713/300 |
| 7,222,250 B2 | * | 5/2007 | Matsubara | 713/320 |
| 7,273,285 B2 | * | 9/2007 | Yen et al. | 353/85 |
| 7,444,530 B2 | * | 10/2008 | Deppe et al. | 713/323 |
| 7,562,236 B2 | * | 7/2009 | Li et al. | 713/300 |
| 7,743,264 B2 | * | 6/2010 | Brown et al. | 713/300 |
| 7,765,416 B2 | * | 7/2010 | Zhou | 713/320 |
| 7,839,409 B2 | * | 11/2010 | Noorbakhsh et al. | 345/531 |
| 8,098,242 B2 | * | 1/2012 | Chen et al. | 345/212 |
| 2002/0060676 A1 | | 5/2002 | Kim | |
| 2002/0190797 A1 | | 12/2002 | Deppe et al. | |
| 2003/0156106 A1 | | 8/2003 | Byun | |
| 2003/0204761 A1 | * | 10/2003 | D'Alessio | 713/320 |
| 2004/0085308 A1 | | 5/2004 | Oh et al. | |
| 2006/0190632 A1 | | 8/2006 | Yang et al. | |
| 2007/0183807 A1 | * | 8/2007 | Park et al. | 399/88 |
| 2007/0257900 A1 | * | 11/2007 | Schulz | 345/211 |
| 2008/0106537 A1 | * | 5/2008 | Chiu | 345/211 |

FOREIGN PATENT DOCUMENTS

| | | |
|---|---|---|
| EP | 1 199 697 | 4/2002 |
| GB | 2 210 217 | 6/1989 |
| JP | 08-152941 | 6/1996 |
| JP | 11-285246 | 10/1999 |
| JP | 11-305880 | 11/1999 |
| JP | 2001-337656 | 12/2001 |
| JP | 2002-359970 | 12/2002 |
| JP | 2003-118204 | 4/2003 |
| JP | 2004-142224 | 5/2004 |
| JP | 2005-049651 | 2/2005 |
| JP | 2006-048001 | 2/2006 |
| TW | 1266267 | 11/2006 |
| WO | WO 99/44116 | 9/1999 |

OTHER PUBLICATIONS

English translation of Office Action issued by the Japanese Patent Office dated Jan. 10, 2012.

VESA® DPMS™ Standard, "Display Power Management Signaling (DPMS) Standard", Version 1.0, Revision 1.0, Aug. 20, 1993.

* cited by examiner

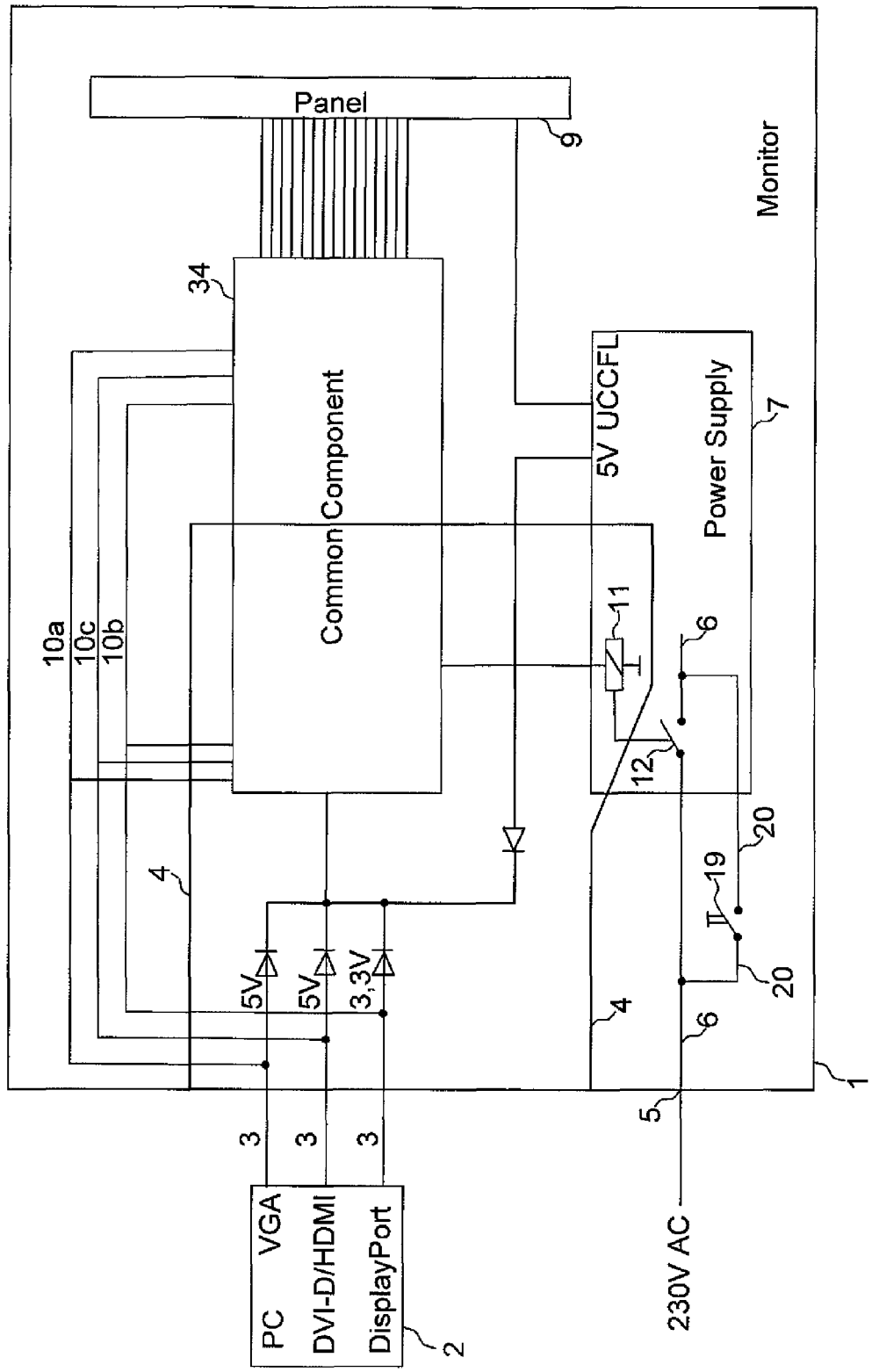

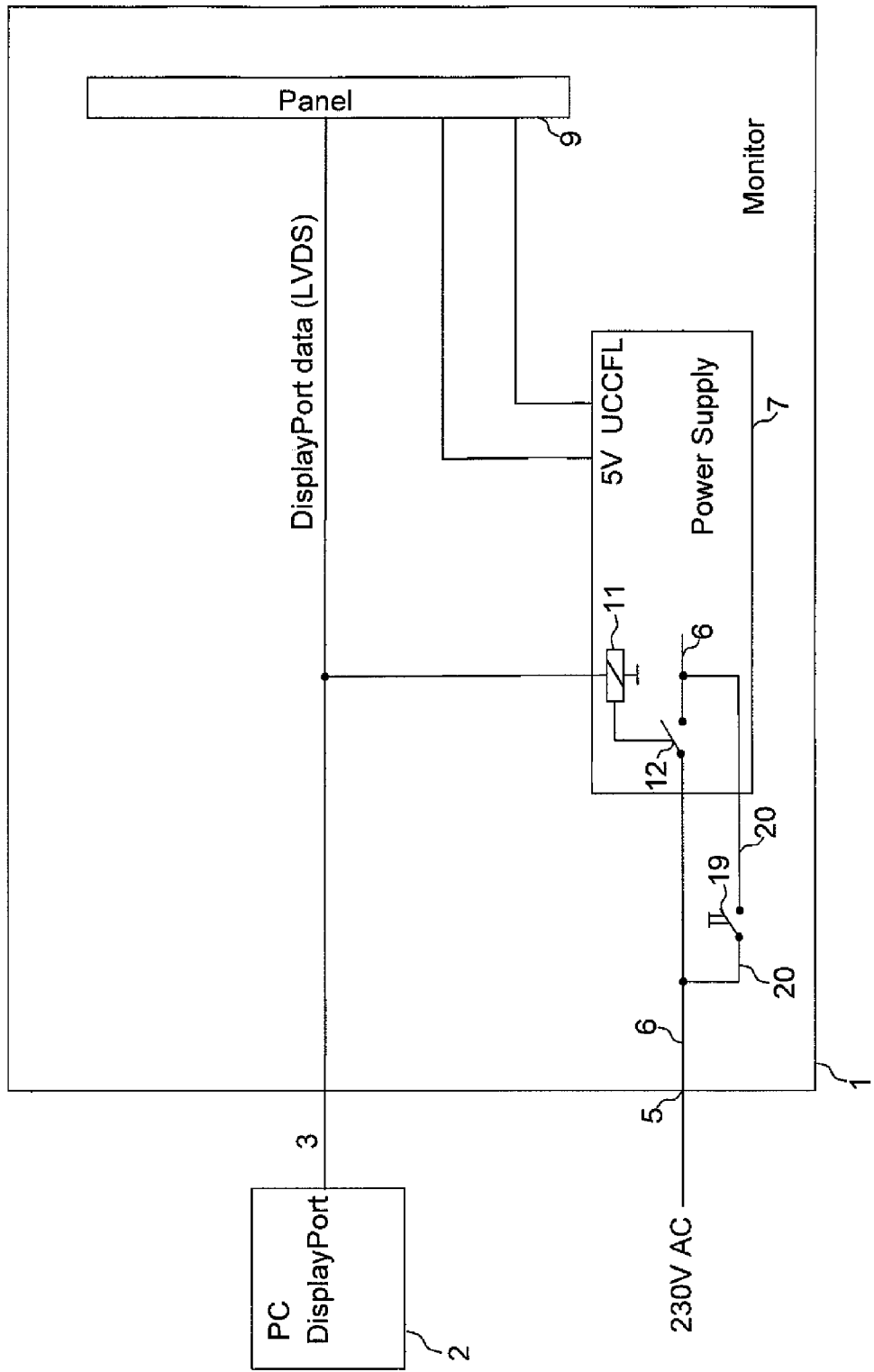

SWITCHED MODE POWER SUPPLY FOR AN ELECTRONIC DEVICE WITH AUXILIARY POWER FOR POWERING AN EVALUATION UNIT DURING AN ENERGY-SAVING STATE

RELATED APPLICATION

This application claims the priority of German patent application no. 10 2007 052 881.9 filed Nov. 2, 2007, the content of which is hereby incorporated by reference.

FIELD OF THE INVENTION

The invention relates to an electronic device, which can assume an operating state and at least one energy-saving state, with a power supply that can be connected to a mains voltage and an evaluation unit, which can control the electronic device from the operating state into the energy-saving state and vice versa.

BACKGROUND OF THE INVENTION

Such electronic devices, like, for example, a monitor connected to a computer, can often also assume several energy-saving states. In the first energy-saving state, as a rule, as many loads are turned off in the electronic device that a quick change into the operating state is possible, while for assuming the energy-saving state with the maximum energy savings, the loads in the electronic device are turned off so far that a return to the operating state is only possible, for example, by a user input, in an example for a system consisting of a monitor and computer, by an input of the user on the computer.

In monitors, there are several classifications for energy-saving states, for example, the VESA standard, wherein the energy-saving states are defined with VESA ON=operating state, VESA SUSPEND=first energy-saving state, VESA STANDBY=second energy-saving state, and VESA OFF=third energy-saving state.

Other standards, like, for example, the DVI standard (Digital Video Interface) have similar definitions, but the energy-saving states are named differently.

All electronic devices that can assume an energy-saving state and are provided with a power supply have in common, however, that even in the maximum energy-saving state, the evaluation unit that can initiate a change from the energy-saving state back into the operating state must still be powered via the power supply. This means that in solutions known up to now, the power supply is in continuous operation during the energy-saving state.

This causes a power consumption of 1-2 W even in the maximum energy-saving state, for example, in a monitor.

SUMMARY OF THE INVENTION

One object of the invention is to provide an electronic device that can assume an energy-saving state can be reduced even further in this energy-saving state.

According to a first aspect of the invention, this object is attained by an electronic device that can assume an operating state and at least one energy-saving state, with a power supply that can be connected to a mains voltage, and an evaluation unit, which can control the electronic device from the operating state into an energy-saving state and vice versa, wherein the evaluation unit is connected to the power supply in such a way that the power supply for assuming the energy-saving state can be turned off by the evaluation unit and can be turned on again for assuming the operating state and the evaluation unit can be supplied with energy from another electronic device that is connected to the electronic device via a standard interface, and/or with energy from a capacitor and/or with energy from an accumulator and/or with energy from a solar cell.

Supplying the evaluation unit with energy from another electronic device via a standard interface or a capacitor or an accumulator or a solar cell or a combination of these alternatives guarantees that the evaluation unit cannot consume current from the mains voltage in the energy-saving state and is nevertheless supplied with energy in order to recognize whether the state is to be changed from the energy-saving state back to the operating state.

The energy savings are achieved by turning off the power supply which, in the solutions of the prior art, remains in continuous operation for powering the evaluation unit. The evaluation unit consumes approximately 500 mW. The power supply, on the other hand, also consumes in standby approximately 1-2 W. Avoiding the power-supply standby is thus associated with large energy savings. Turning off the power supply offers the further advantage that this protects the system from damage. In repair statistics for electronic devices, the power supply is in first place for failure.

For the devices according to the prior art, especially for a combination of a computer and monitor, when the computer is turned off, it is always signaled on the monitor via the LEDs on the front that the monitor is also off. In fact, the power supply in the monitor is always on and has a power consumption of 1-2 W even when the computer was turned off.

The electronic device can be, as already indicated above, a monitor, a television, a computer, or a copier or some other electronic device that can assume an energy-saving state.

The basic idea of the invention is that, in the energy-saving state, little or no current is consumed from the mains voltage and nevertheless the device can be switched back into the operating state by an action, for example, a user action.

In the embodiment in which the evaluation unit is supplied in the turned-off state with energy from another electronic device that is connected to the electronic device via a standard interface, advantageously the other electronic device is a computer connected to a monitor, or it is a receiver connected to a television.

To prevent additional proprietary line connections, the standard interface is used. The devices originate from various manufacturers and compatibility would make an additional line connection nearly unrealizable in practice. Advantageously, the standard interface is designed as a VGA (Video Graphic Array), DVI (Digital Video Interface), HDMI (High Definition Multimedia Interface), Display Port, or Scart interface.

The VGA, DVI, HDMI, and DisplayPort interfaces have a 5 or 3.3 V line and other signal lines, so that the energy from the voltage line of the interface and/or from the other signal lines can be used. The Scart interface has no 5 V line, but the energy from the signal lines can be used.

To control the electronic device from the operating state into the energy-saving state, the evaluation unit is advantageously coupled with a measurement device for determining the duration of non-use of the electronic device or the other device.

In the example of the embodiment of the electronic device as a monitor connected to a computer, the measurement device is favorably arranged in the other electronic device, that is, in the computer, and the coupling with the evaluation unit is realized via the connection lines of the standard interface.

The measurement device coupled with the evaluation unit favorably monitors the user action on the electronic device or on the other electronic device, such as, for example, the computer, after a time in which no user action has taken place, and reports to the evaluation unit that the electronic device should be switched from the operating state into the energy-saving state.

Switching the electronic device from the operating state into the energy-saving state can be realized, for example, by a switch in the feed of the mains voltage to the power supply, which is opened when the power supply is turned off in a way controlled by the evaluation unit.

According to one embodiment, for this purpose, the evaluation unit has a relay, wherein the feed of mains voltage to the power supply can be broken by opening the relay.

Alternatively, the connection between the evaluation unit and the power supply can also be designed as an optoelectronic coupling. In this embodiment, for example, the evaluation unit includes a photodiode and the power supply includes a phototransistor, wherein the phototransistor can be controlled by means of the photodiode of the evaluation unit in such a way that the power supply can be turned off and on.

For a power supply that transforms an alternating voltage into a direct voltage through pulse-width modulation and has a rectifier, a chopper, and a transmitter for this purpose, the power supply according to another embodiment of the invention can also be turned off by turning off the transmitter in such a power supply.

Alternatively, for turning off the transmitter, such a power supply can also be turned off by reducing the pulse-width modulation to 0 duty cycles, for example.

In an embodiment of the invention having energy supplied to the evaluation unit via a capacitor, this capacitor is favorably connected to the power supply of the electronic device and is charged by this power supply when the power supply is in the turned-on state. The same applies for the an embodiment of the invention with an accumulator.

In an embodiment of the electronic device with a solar cell and capacitor and/or accumulator, the solar cell is favorably connected to the capacitor and/or to the accumulator, so that the solar cell is used for maintaining the charge on the capacitor and/or accumulator for a longer time. In this embodiment with the solar cell, the capacitor and/or accumulator does not absolutely have to be charged via the power supply in the turned-on state; the charging can instead be realized by only the solar cell.

In the embodiment in which the electronic device is connected via a standard interface to anther electronic device, the charging of the capacitor and/or the accumulator can be realized additionally or alternatively by means of the energy from the connection lines of the standard interface.

Favorably, in the electronic device there is also the possibility to provide, for example, a switch that allows the power supply to be turned on manually when this was turned off by the evaluation unit. This possibility for activation is important if the electronic device has not been supplied with current for a long time like, for example, between manufacture and first activation, and the capacitor and/or the accumulator has drained in the meantime due to self-discharge.

This possibility for manual activation can be combined with the normal power switch on the electronic device, wherein this switch must be pressed only once or must be switched from ON to OFF and back to ON.

In the embodiment in which the electronic device is connected to another electronic device via a standard interface, it is favorable if the evaluation unit evaluates the voltage line in the standard interface.

As a function of the voltage level or whether, in principle, voltage is being applied or not, the electronic device is controlled into the energy-saving state.

Alternatively or additionally, in this embodiment in which the electronic device is connected to another electronic device, the other connection lines to the standard interface, like, for example, HSYNC and VSYNC or, in the construction as a DVI interface, the clock line, are also evaluated by the evaluation unit.

The evaluation of the sync lines and/or the clock line can be used alternatively for evaluating the voltage line, in order to report to the evaluation unit that the electronic device should be controlled from the operating state into the energy-saving state. As in the VESA standard, the evaluation of the other connection lines of the standard interface, like, for example, the sync lines, allows the possibility of controlling the electronic device into several energy-saving states, in which, for example, only the HYSNC or VSYNC, or HSYNC and VSYNC are interrupted. A combination of the evaluation of the voltage line of the standard interface and the other connection lines, like, for example, the sync lines or the clock line, thus also allows the control of the electronic device into several energy-saving states.

According to another aspect, the invention concerns a computer for connecting to an electronic device according to the embodiments described above via a standard interface that includes a voltage line, wherein the computer has a control unit that can interrupt the voltage line or set it to a low voltage level for controlling the evaluation unit.

Likewise, another aspect of the invention relates to an arrangement made from such a computer and an electronic device according to the embodiments described above.

In addition, another aspect of the invention relates to a method for controlling an electronic device according to the embodiments described above in at least one energy-saving state or from an energy-saving state back into the operating state, wherein an evaluation unit in the electronic device evaluates the connection lines of the standard interface, or a measurement device evaluates the electronic device, which indicates whether the electronic device has not been used for a certain time, and the evaluation unit is connected to the power supply in such a way that the power supply can be turned off or on by the evaluation unit, and when the power supply is turned off, the evaluation unit is supplied with energy from the connection lines of the standard interface and/or with energy from a capacitor and/or with energy from an accumulator and/or with energy from a solar cell.

BRIEF DESCRIPTION OF THE DRAWINGS

Figure 1:
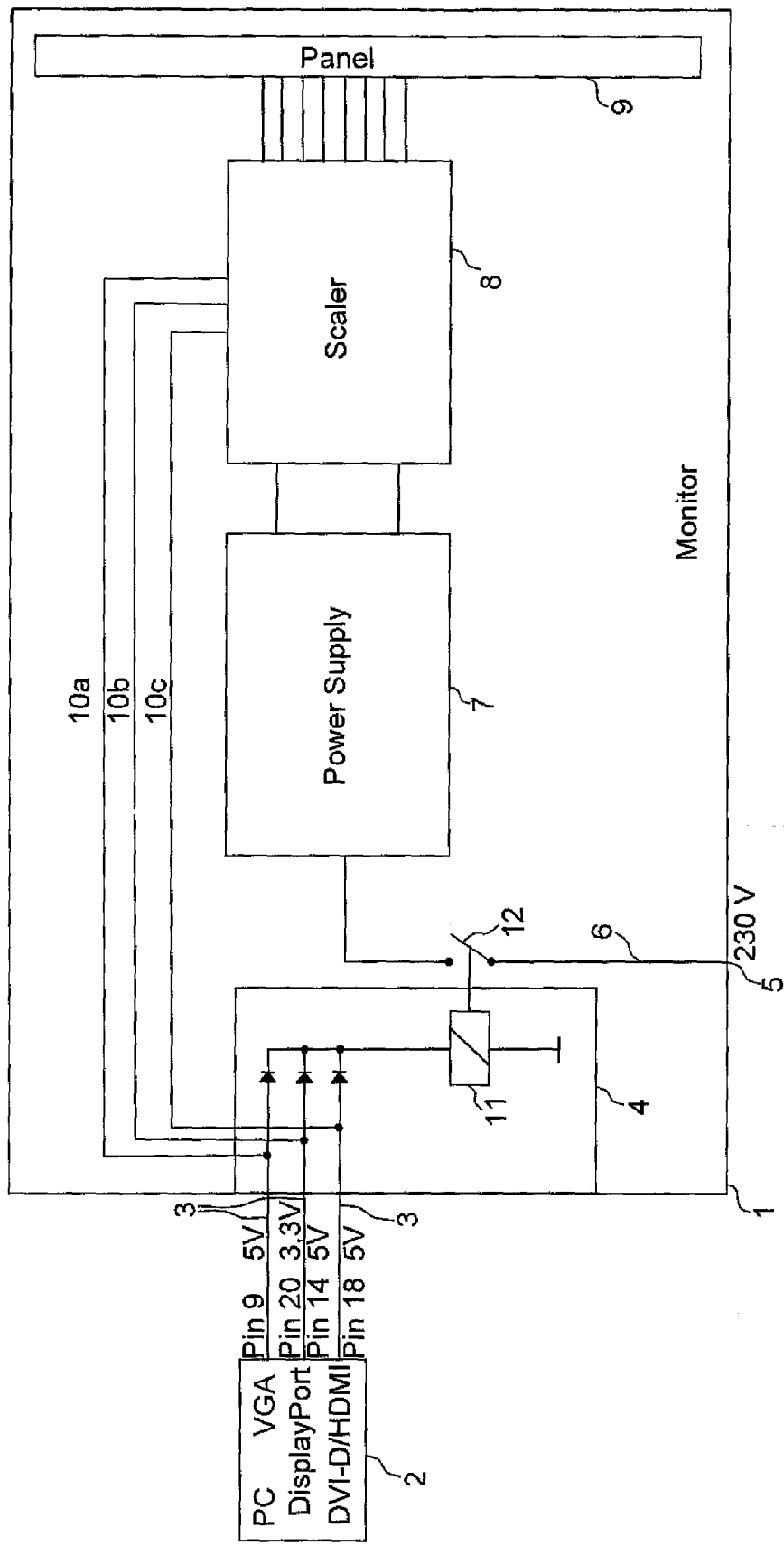
FIG. 1, a schematic representation of a first electronic device in the form of an LCD monitor, which is connected via a standard interface to a second electronic device in the form of a computer, with voltage being supplied to the evaluation unit via the 5 or 3.3 V lines of the standard interface, FIG. 2, the view according to FIG. 1 with voltage being supplied via a capacitor, FIG. 3, the view according to FIG. 1 with voltage being supplied by means of an accumulator, FIG. 4, the view according to FIG. 1 with voltage being supplied via a solar cell and an accumulator, FIG. 5, the view according to FIG. 2 with an additional possibility for manual activation of the power supply, FIG. 6, the view according to FIG. 3 in combination with the evaluation of additional connection lines of the standard interface, FIG. 7, the view according to FIG. 6 in combination with a solar cell, FIG. 7a, the view according to FIG. 7 with a signal detector for evaluating the SYNC lines of the standard interface, FIG. 7b, the view according to FIG. 7a with a possibility for manual activation through a connection to the 5 or 3.3 V line of the standard interface, FIG. 8, an embodiment with a microprocessor in the evaluation unit, FIG. 9, the view according to FIG. 8 with the construction of the microprocessor and the scaler in a common module, FIG. 9a, the view according to FIG. 9 with evaluation of the DDC lines by the evaluation unit, FIG. 9b, an embodiment with DisplayPort and direct control of a monitor panel via LVDS data, FIG. 10, a schematic representation of the other electronic device in the form of a computer, FIG. 11, the view according to FIG. 1 with a simple optoelectronic coupling between the evaluation unit and the power supply, FIG. 12, the view according to FIG. 11 with evaluation of the other connection lines of the standard interface, FIG. 13, a circuit diagram of a standby recognition circuit for evaluating the sync signals of the standard interface.

FIG. 1 shows a schematic representation of an arrangement made from a first electronic device 1 in the form of an LCD monitor and another electronic device 2 in the form of a computer. The first electronic device 1 is connected to the other electronic device 2 via a standard interface 3. FIG. 1 shows three standard interfaces 3, one according to the VGA standard, one as DisplayPort according to the VESA standard, and one according to the DVI-D standard or HDMI standard. In practice, however, the first electronic device 1 is connected to the other electronic device 2 only via a single standard interface 3.

The standard interfaces and also the connection lines are formed strictly according to specifications, for which a more detailed explanation is readily available in literature describing these standard interfaces.

In the electronic device 1, an evaluation unit 4 is arranged, which can control the first electronic device 1 from the operating state into an energy-saving state and vice versa. The evaluation unit 4 is not a mechanical component, but instead a logical function unit, which can be realized by circuits and electronic components or by a microprocessor with corresponding programming.

The electronic device 1 has a terminal 5 for connecting to the mains voltage. In the shown embodiment, an alternating voltage of 230 V is applied to the terminal 5. This alternating voltage is fed via a line 6 to an internal power supply 7 in which the alternating voltage is converted from 230 V into a direct voltage of 5 or 12 V.

All of the loads in the electronic device 1 are powered via the internal power supply 7. As examples, a scaler component 8 and also a panel 9 (e.g. display screen) are shown, by means of which the image contents are displayed. The scaler component 8 is connected via a line 10a to the VGA standard interface 3, so that the signals transmitted via the VGA interface, like, for example, the RGB signal, can be processed in the scaler component.

In the construction as a DisplayPort interface, the scaler component is connected via a line 10b to the DisplayPort standard interface 3, so that data, in particular digital data, can be processed via the DisplayPort standard interface 3 in the scaler component.

In the construction with a DVI-D or HDMI interface, the scaler component is connected via a line 10c to the standard interface 3.

An electronic device 1 in the form of an LCD monitor has a power consumption of approximately 50-200 W in the operating state according to the size and representation of the image contents. In the energy-saving state for computer monitors, the energy consumption equals approximately 1-2 W in the so-called VESA OFF state.

The consumption of 1-2 W for devices according to the prior art is due to the fact that the evaluation unit 4 must be supplied with energy even in the energy-saving state. As a rule, the power supply 7 also must be operated internally because the evaluation unit 4 must be supplied with direct voltage. The consumption of the evaluation unit 4 lies is approximately 500 mW. The operation of the power supply, however, is at least 1-2 W.

In the embodiment shown according to FIG. 1, the evaluation unit 4 is supplied with energy from the connection lines of the standard interface 3 in the energy-saving state. In the construction of the standard interface as a VGA interface, this is pin 9, on which 5 V is applied; in the construction of the DVI-D standard interface 3, this is pin 14, and in the construction as an HDMI standard interface 3, this is pin 18, on each of which a 5 V voltage is applied if the electronic device 2 in the form of a computer connected to this interface is turned on. In the construction as a DisplayPort standard interface, this is pin 20, on which 3.3 V is applied.

The evaluation unit 4 has, in addition, a relay 11, which is arranged through a switch 12 in the line 6 between the terminal 5 for the mains voltage and the internal power supply 7. The relay 11 is powered via the 5 or 3.3 V voltage from the connection lines of the standard interface and can open the switch 12 for switching the electronic device 1 into an energy-saving state and can reclose the switch 12 for switching back into the operating state.

In the shown embodiment, the control of the relay 11 can be realized in such a way that the 5 or 3.3 V line of the standard interface 3 is turned on or off or is interrupted by means of the other electronic device 2. In the absence of the 5 or 3.3 V voltage on the corresponding line of the standard interface 3, the relay 11 is not supplied with power, as a result of which the switch 12 opens. The electronic device 1 therefore enters into an energy-saving state, in which absolutely no energy provided via the mains voltage is consumed. The power consumption in this energy-saving state of power provided via the mains voltage thus decreases to 0 W.

If the voltage is reapplied to the corresponding line of the standard interface 3, the relay 11 is resupplied with voltage and the switch 12 in the line 6 closes. The electronic device 1 is therefore again in the operating state.

Below, additional embodiments of the invention will be explained. In the following embodiments, elements with the same function are provided with identical reference symbols and will not be explained in more detail.

Figure 2:
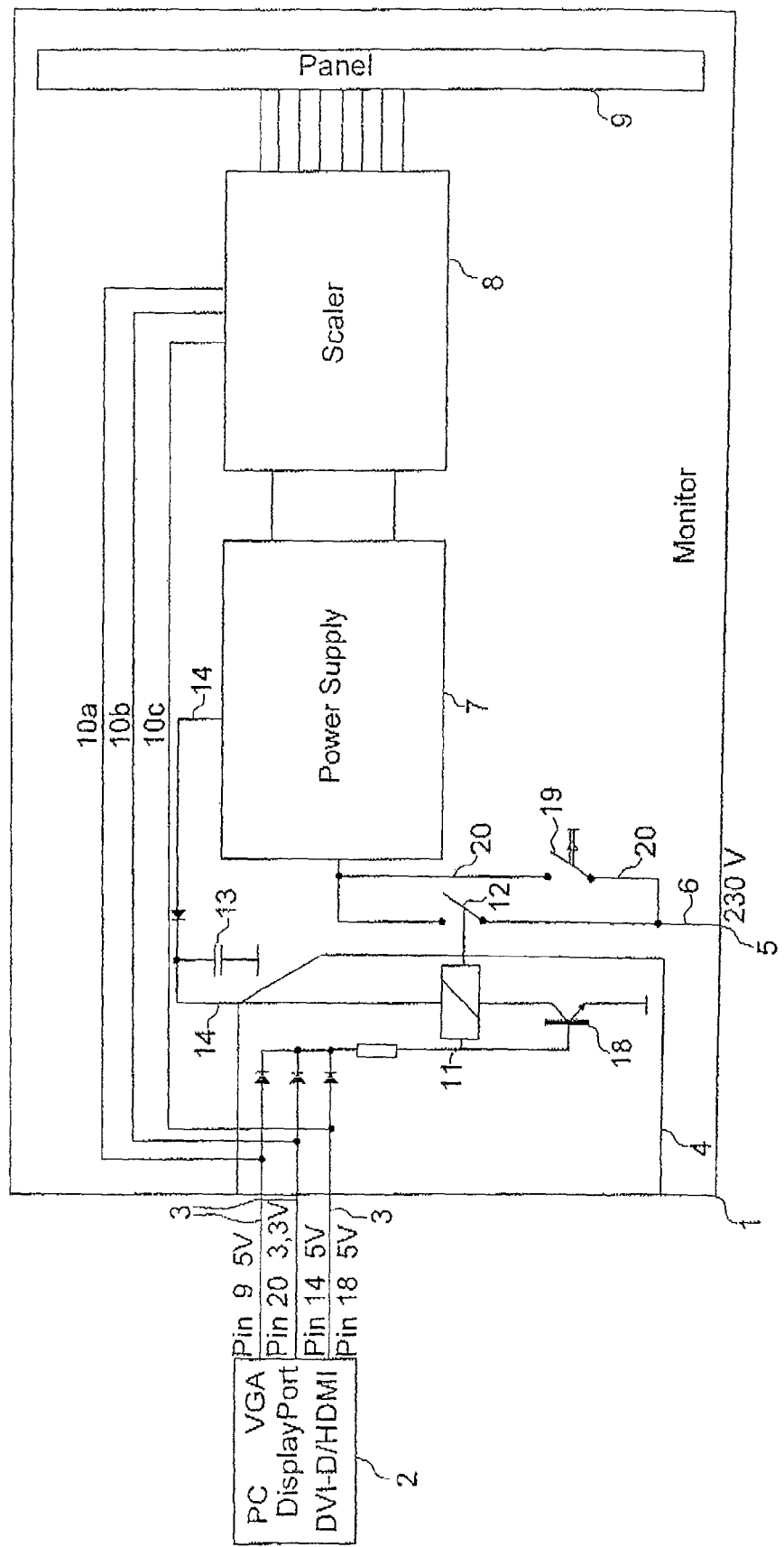

FIG. 2 shows an embodiment in which the evaluation unit 4 is supplied with energy in the turned-off state of the power supply 7 partially via the 5 or 3.3 V line of the standard interface 3 and also via a capacitor 13, which is connected via a line 14 to the evaluation unit 4. For this purpose, the evaluation unit 4 has a transistor 18, wherein the base power for the transistor 18 is provided via the 5 or 3.3 V voltage line of the standard interface 3. If the transistor 18 receives voltage from the 5 or 3.3 V line of the standard interface, the relay 11 switches and closes the switch 12, so that the electronic device 1 switches from the energy-saving state into the operating state.

The relay 11 is also connected via the line 14 to the capacitor 13, so that in the embodiment according to FIG. 2 in the turned-off state of the power supply 7, that is, in the energy-saving state, the evaluation unit 4 is supplied with energy from the connection lines of the standard interface 3 and also from the capacitor 13.

For the case where the capacitor 13 drains through self-discharge in the course of time and too little energy can be provided for the activation process for the evaluation unit 4 via the standard interface 3, the arrangement in the mains line 6 has a bypass line 20 for the switch 12, in which another switch 19 is integrated. The other switch 19 is to be operated manually from the outside and is used to reconnect the power supply 7 to the mains voltage on the terminal 5 by closing the switch 19 if the capacitor 13 is drained or has drained so far that too little energy is available for an activation process via the relay 11 and the switch 12.

The control of the evaluation unit 4 can be realized either via the voltage lines of the standard interface 3 or (not shown in FIG. 2) via the sync lines or, for construction as a DVI, HDMI, or DisplayPort standard interface, via the clock lines.

Figure 3:
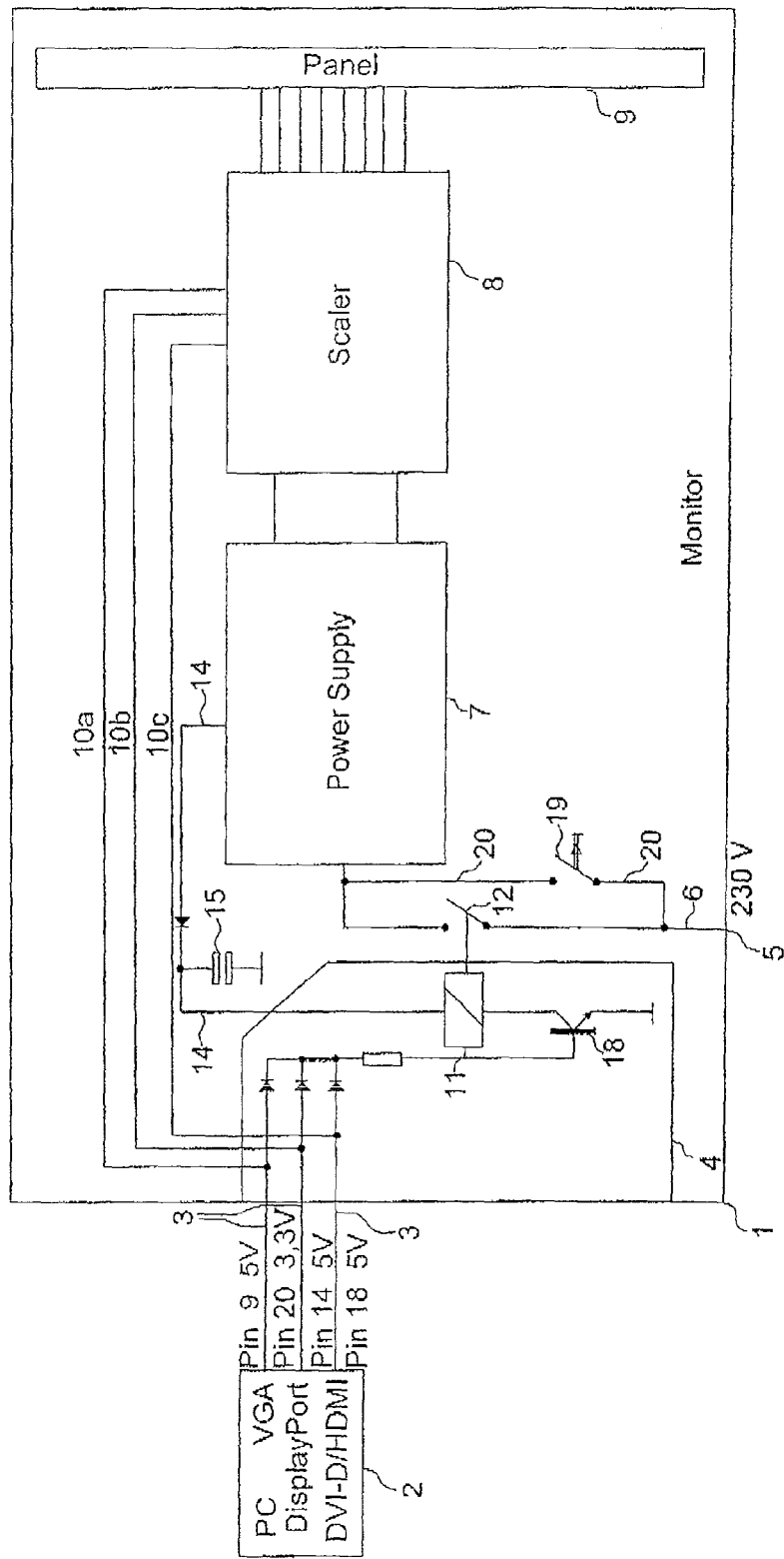

FIG. 3 shows essentially the same embodiment as FIG. 2, wherein, instead of the capacitor 13, an accumulator 15, as a rule an electrochemical energy storage device, is used for supplying energy to the evaluation unit 4 at least in the energy-saving state of the electronic device 1. The accumulator 15 is also connected via the line 14 to the power supply 7 and is charged via the power supply 7 in the operating state of the electronic device 1.

Figure 4:
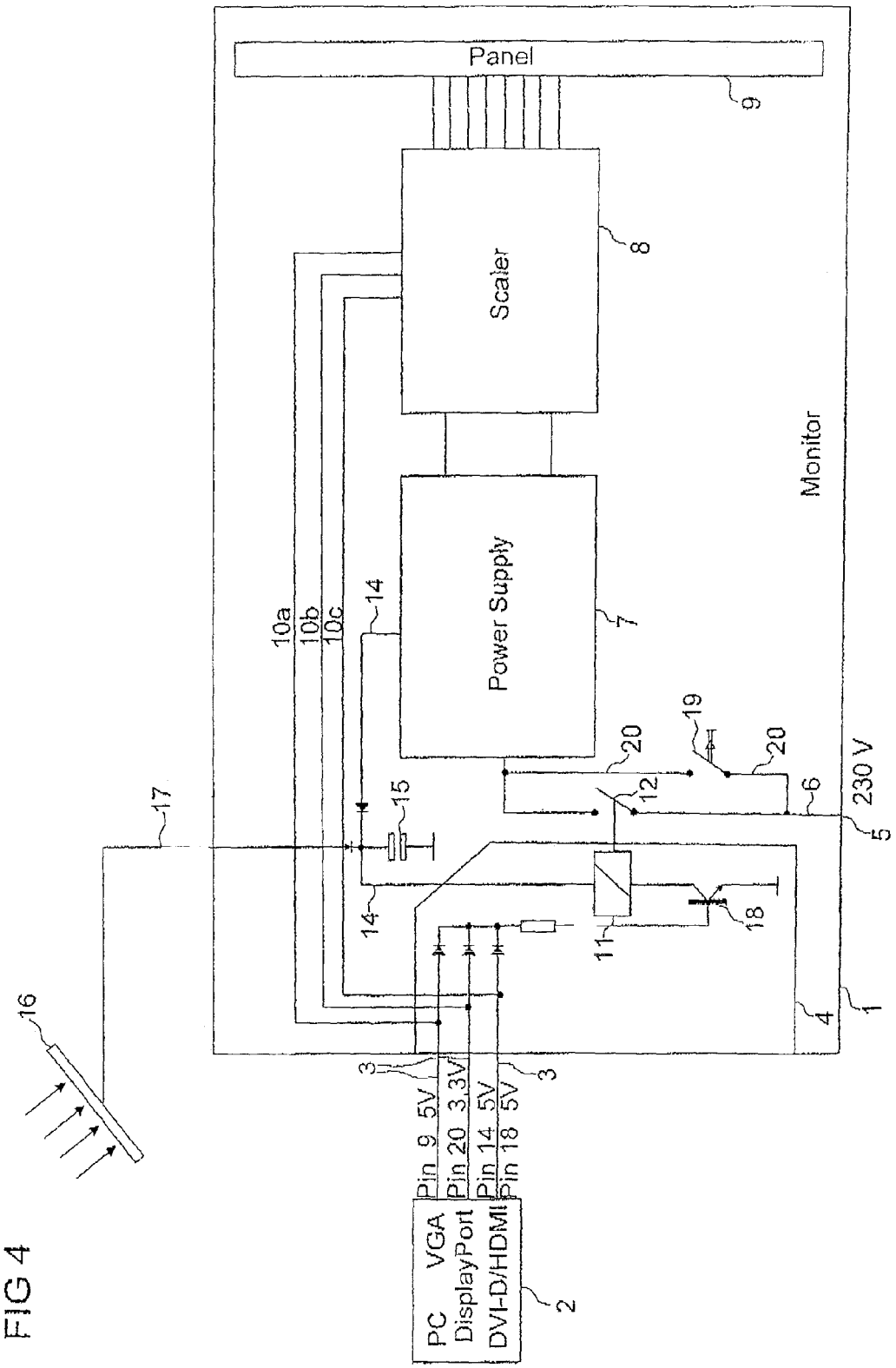

FIG. 4 shows essentially the arrangement according to FIG. 2, wherein for supplying energy to the evaluation unit 4, a solar cell 16 is connected to the evaluation unit 4 via a line 17. The control of the evaluation unit 4 or the signaling as to whether the electronic device 1 should switch into an energy-saving state can be realized via the 5 or 3.3 V line of the standard interface 3 or (not shown in FIG. 4) via the sync or clock line of the standard interface 3.

Figure 5:
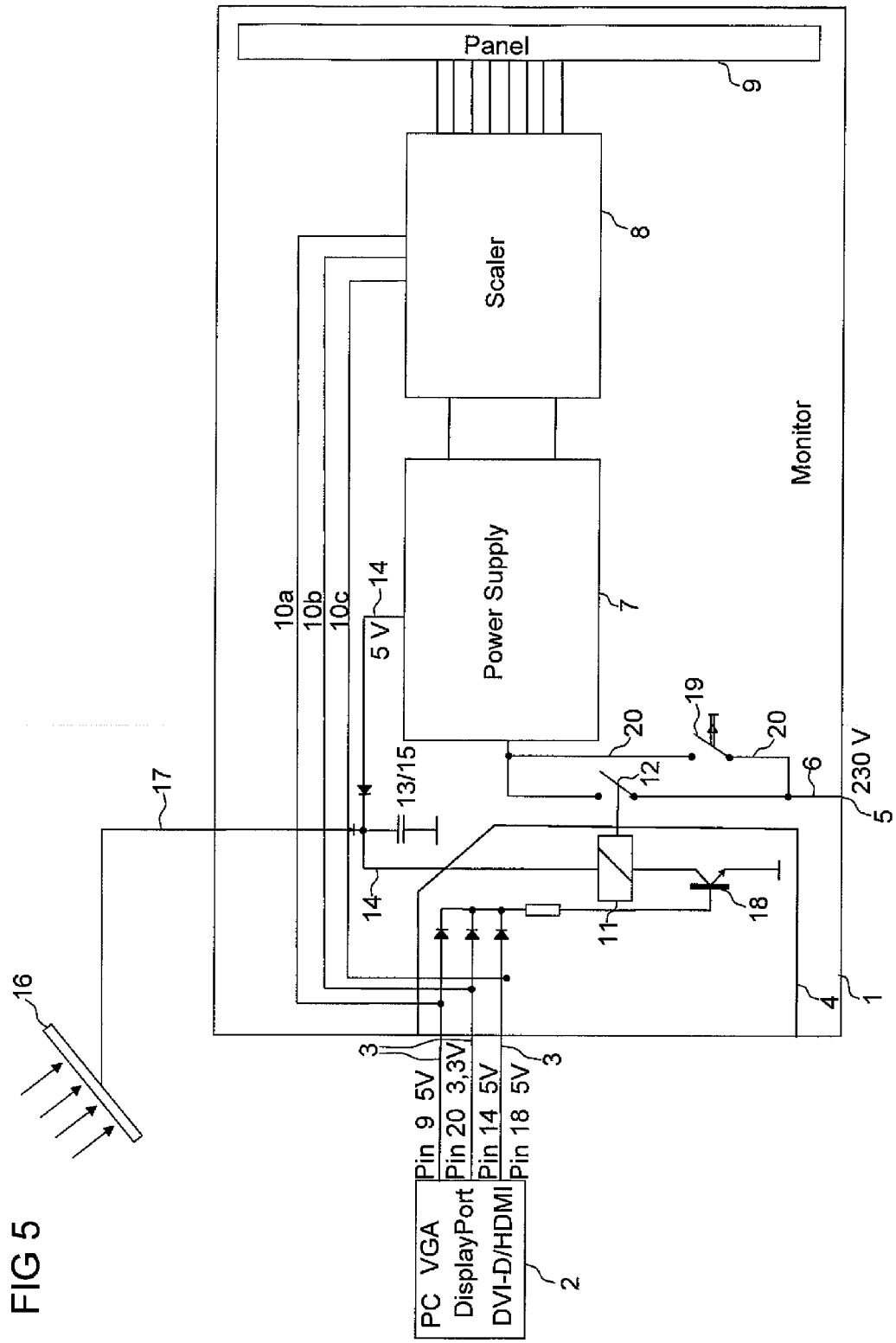

FIG. 5 shows essentially the embodiment according to FIG. 4, wherein instead of the accumulator 15, a capacitor 13 can be provided. Formulated in general, an energy storage device 13/15 is provided, which is charged via the 5 or 3.3 V line of the power supply 7 in the turned-on state of the second electronic device 2 or via the solar cell 16.

For the case where the energy storage device 13/15 is drained through self-discharge in the course of time and too little energy can be provided for the activation process for the evaluation unit 4 via the standard interface 3, the arrangement also has, as in the construction according to FIG. 2, a bypass line 20 for the switch 12, in which another switch 19 is integrated, in the mains line 6. The other switch 19 is to be operated manually from the outside and is used to reconnect the power supply 7 to the mains voltage in the terminal 5 by closing the switch 19 if the energy storage device 13/15 is drained or has been drained so far that too little energy is available for an activation process via the relay 11 and the switch 12.

Figure 6:
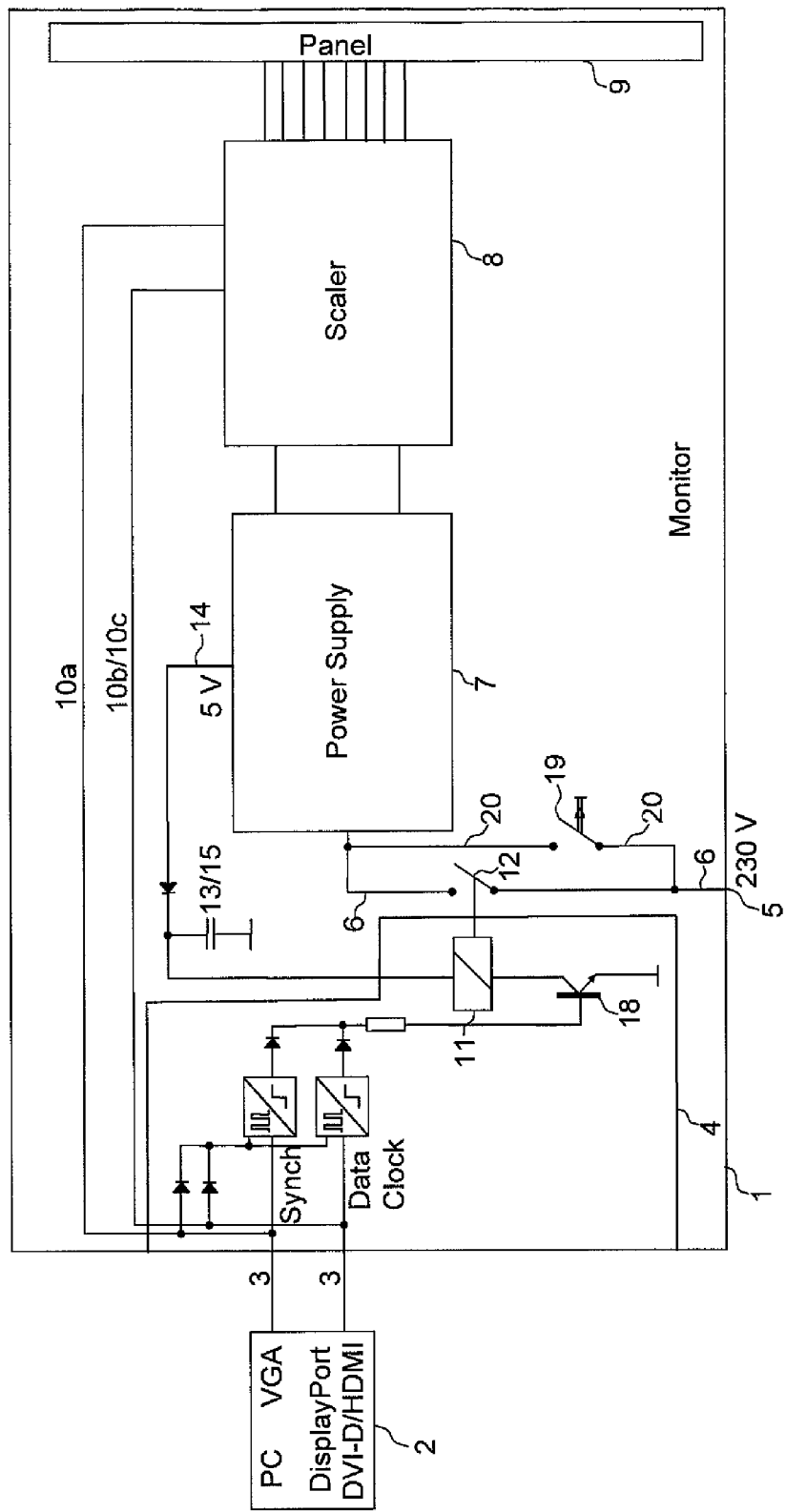

FIG. 6 shows a modification of the embodiment according to FIG. 5 without a solar cell 16. The HDMI interface and the DisplayPort interface are shown together with the DVI-D standard interface and are not drawn separately.

For the control of the evaluation unit in the energy-saving state in the construction as a VGA standard interface 3, in this embodiment not only the 5 or 3.3 V line, but also the sync lines, that is, the lines for HSYNC and VSYNC, are evaluated. For the construction as a DisplayPort, HDMI, or DVI-D standard interface 3, in addition to the 5 or 3.3 V line, the data clock line is also used for signaling to the evaluation unit 4 as to whether this should switch the electrical device 1 into an energy-saving state or not.

Through the use of sync lines or the data clock lines as an alternative or addition to the 5 or 3.3 V line in the standard interface 3, it is possible to control the electronic device 1 into several energy-saving states. The other loads, which are turned off in the intermediate energy-saving states in which the power supply has not yet been separated from the mains voltage, and how this is realized is not drawn in the schematic representation according to FIG. 6.

In the energy-saving state which should achieve the greatest energy savings, i.e., an energy-saving state like that corresponding to the VESA OFF mode, it is therefore possible to turn off the power supply 7 of the first electronic device and thus to also save the standby consumption of the power supply 7.

In the monitor or in the first electronic device, therefore, the power supply is turned off not only upon switching off the second electronic device, as a rule the computer, or upon interruption of the 5 or 3.3 V line of the standard interface, but also upon signaling (e.g., providing the monitor with the "message" specifying the energy saving state into which the monitor should switch) independent of the 5 or 3.3 V line of the standard interface. For example, if a standby or suspend or OFF mode is signaled by the electronic device 2, the evaluation unit 4 can evaluate this and the electronic device 1 can switch into an energy-saving state, in which no energy is consumed from the mains voltage provided via the terminal 5.

Figure 7:
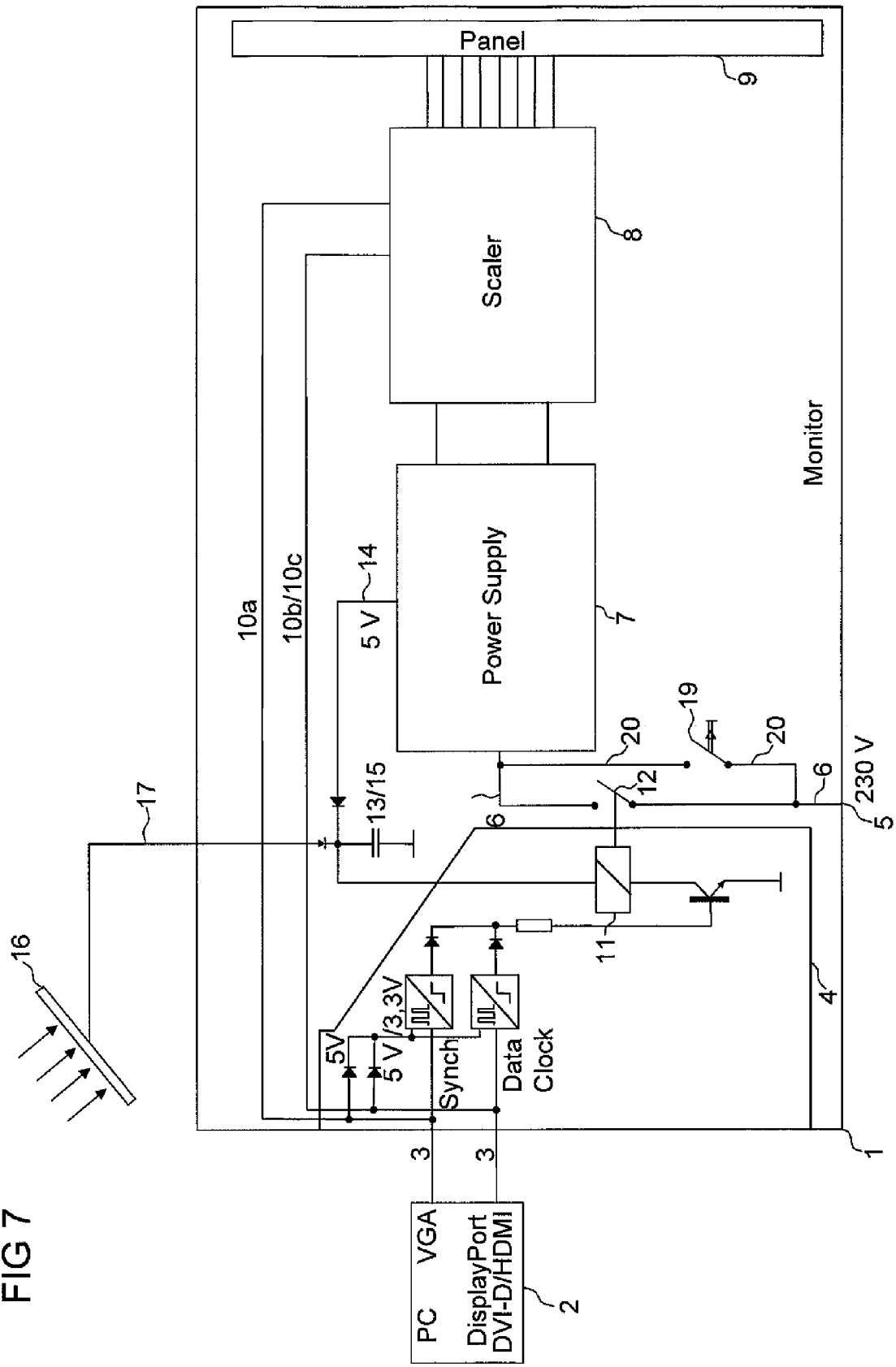

FIG. 7 shows the embodiment according to FIG. 6 with solar cell 16. The solar cell 16 is connected via the line 17 to the energy storage device 13/15 and can thus charge this storage device.

Figure 7A:
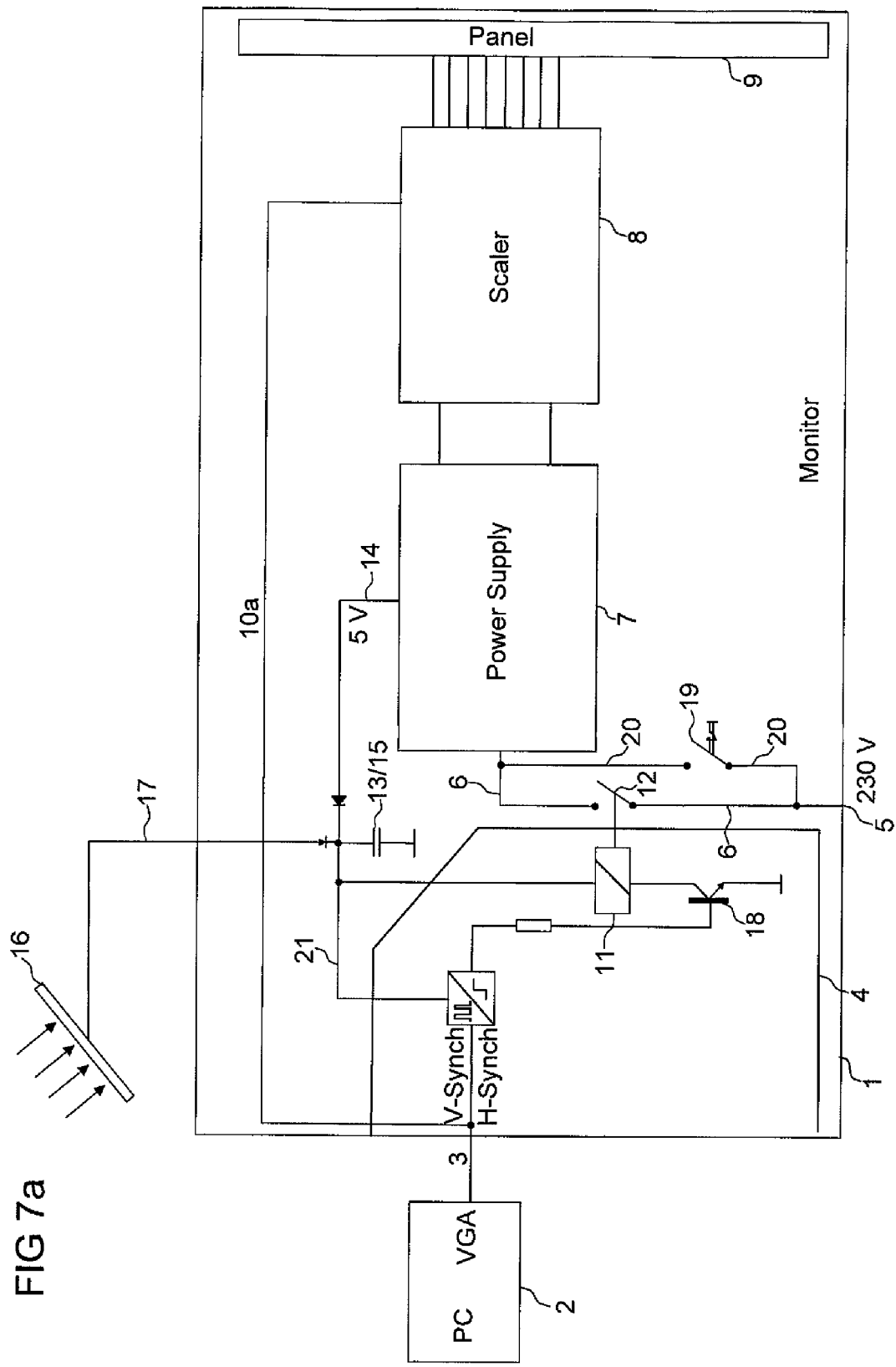

FIG. 7a represents a modification to the embodiment according to FIG. 7. For simplification, only the VGA standard interface 3 is drawn. In the embodiment according to FIG. 7a, the 5 or 3.3 V voltage line of the standard interface 3 is not used for powering and controlling the evaluation unit 4. The relay 11 is supplied with energy from the capacitor 13 or the accumulator 15 or the solar cell 16 in the turned-off state of the power supply 7. The base power for the transistor 18 is also provided via the solar cell 16 and the capacitor 13 or the accumulator 15 via a connection line 21. The connection line 21 also supplies power to the part of the evaluation unit 4 that evaluates the sync signals, or for the construction of the standard interface according to HDMI, DVI-D, or DisplayPort standard, to the Data Clock signals of the standard interface 3. The transistor 18 receives voltage or not depending on whether the electronic device 1 is to be switched into an energy-saving state corresponding to the energy-saving state or is to be switched back into the operating state.

Figure 7B:
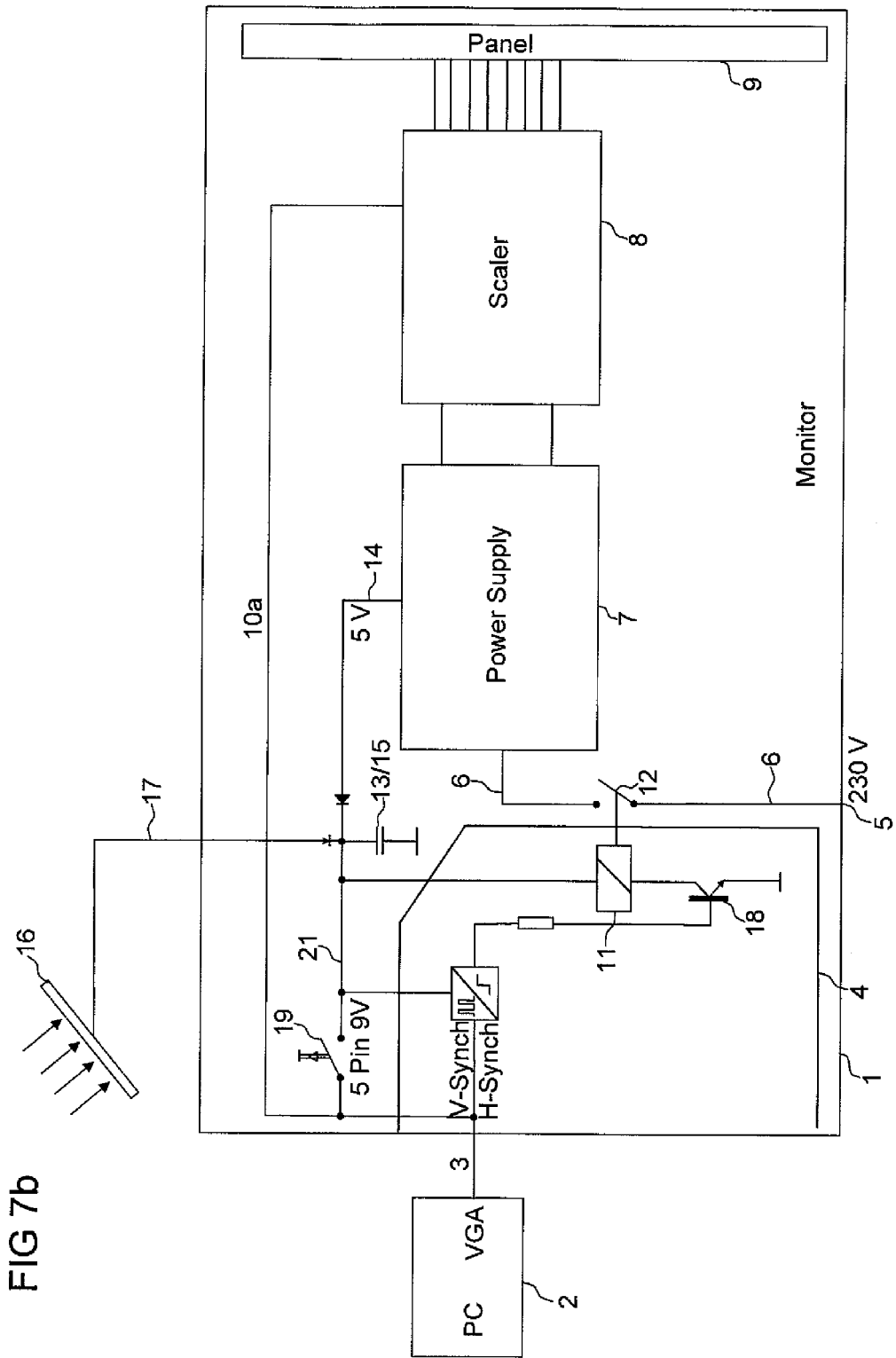

FIG. 7b shows a modification to FIG. 7a, wherein the connection line 21 is connected in this embodiment via a switch 19 to the 5 or 3.3 V line of the standard interface 3. If the energy storage device 13/15 is drained and no energy can be provided by the solar cell 16 for the activation of the switch 12, then the switch 19 can be activated by hand, as a result of which the energy is made available via the 5 or 3.3 V line of the standard interface and this energy from the 5 or 3.3 V line of the standard interface can be used for activating the switch 12.

Figure 8:
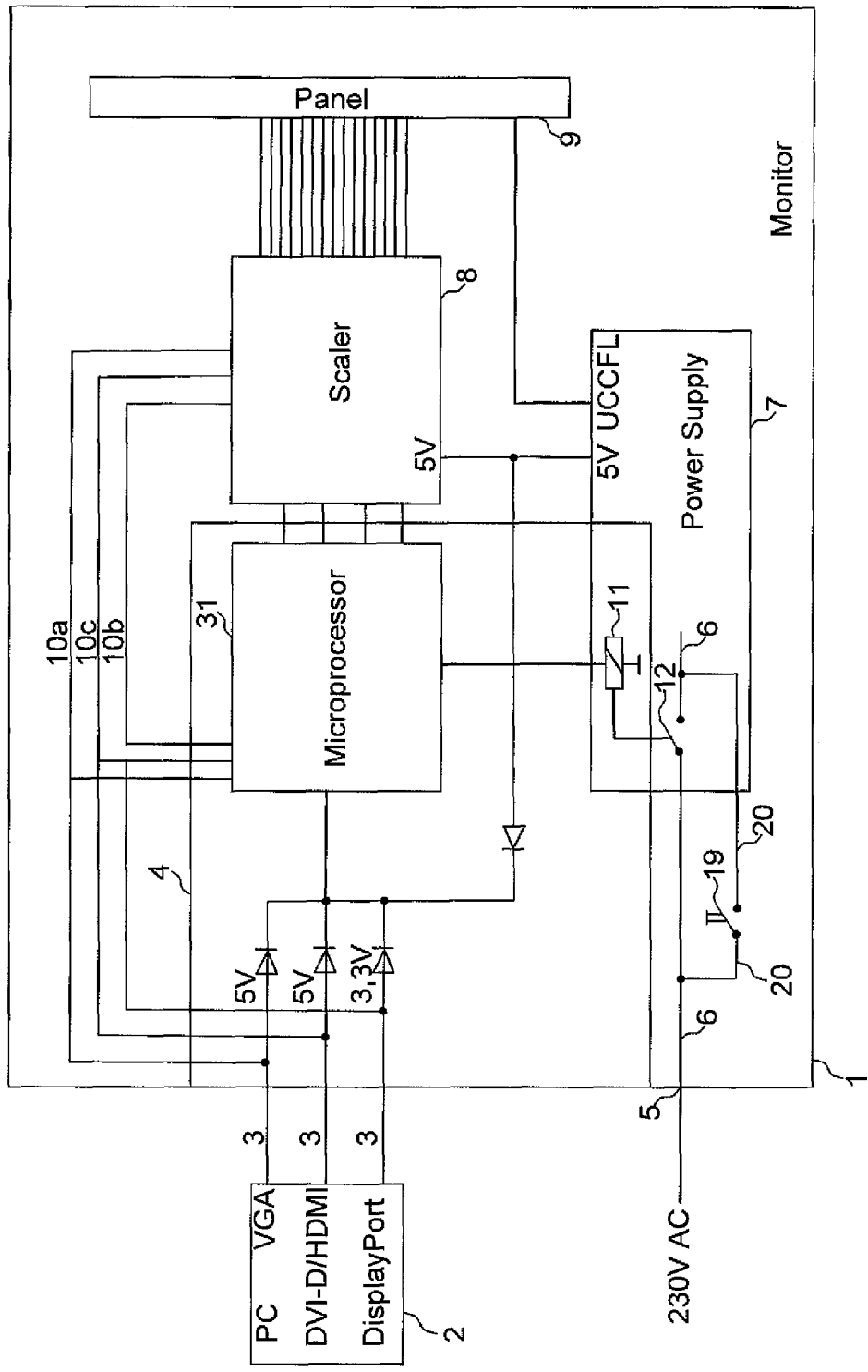

FIG. 8 shows an embodiment in which the relay 11, which can open and close the switch 12 in the line 6, is controlled via a microprocessor 31. The microprocessor 31 is powered via the 5 or 3.3 V line of the standard interface 3 and also evaluates the other line connections of the standard interface 3.

If the PC, i.e., the second electronic device 2, is in the ON mode, the microprocessor 31 in the monitor, i.e., in the first electronic device 1, is supplied with 5 or 3.3 V via the standard interface 3 from the PC. Powering the microprocessor 31 via the 5 or 3.3 V line of the standard interface is also then maintained when the monitor 1 is controlled by the PC 2 into the standby mode. With reference to the control signals (H-sync and V-sync for VGA, clock for DVI, HDMI, and DisplayPort), the microprocessor 31 recognizes which state the monitor 1 is to assume—turned-on or standby (0 W).

If the PC 2 is in the standby mode or deep sleep mode or is turned off, there is no 5 or 3.3 V on the corresponding connection line of the standard interface 3 and the relay 11 in the monitor 1 is turned off. In order to guarantee monitor operation even with the lack of the 5 or 3.3 V power supply from the controlling electronic device 2 (PC, DVD player, . . . ), a switch 19 for bridging the relay contact, i.e., the switch 12, is provided. When the switch 19 is closed, the 0 W mode is turned off and the monitor consumes at least 0.5-2 W provided on the mains (230 V).

FIG. 9 shows essentially the embodiment according to FIG. 8, wherein the microprocessor 31 and the scaler 8 are combined into a common module 34, a so-called IC (IC=Integrated Circuit).

Figure 9A:
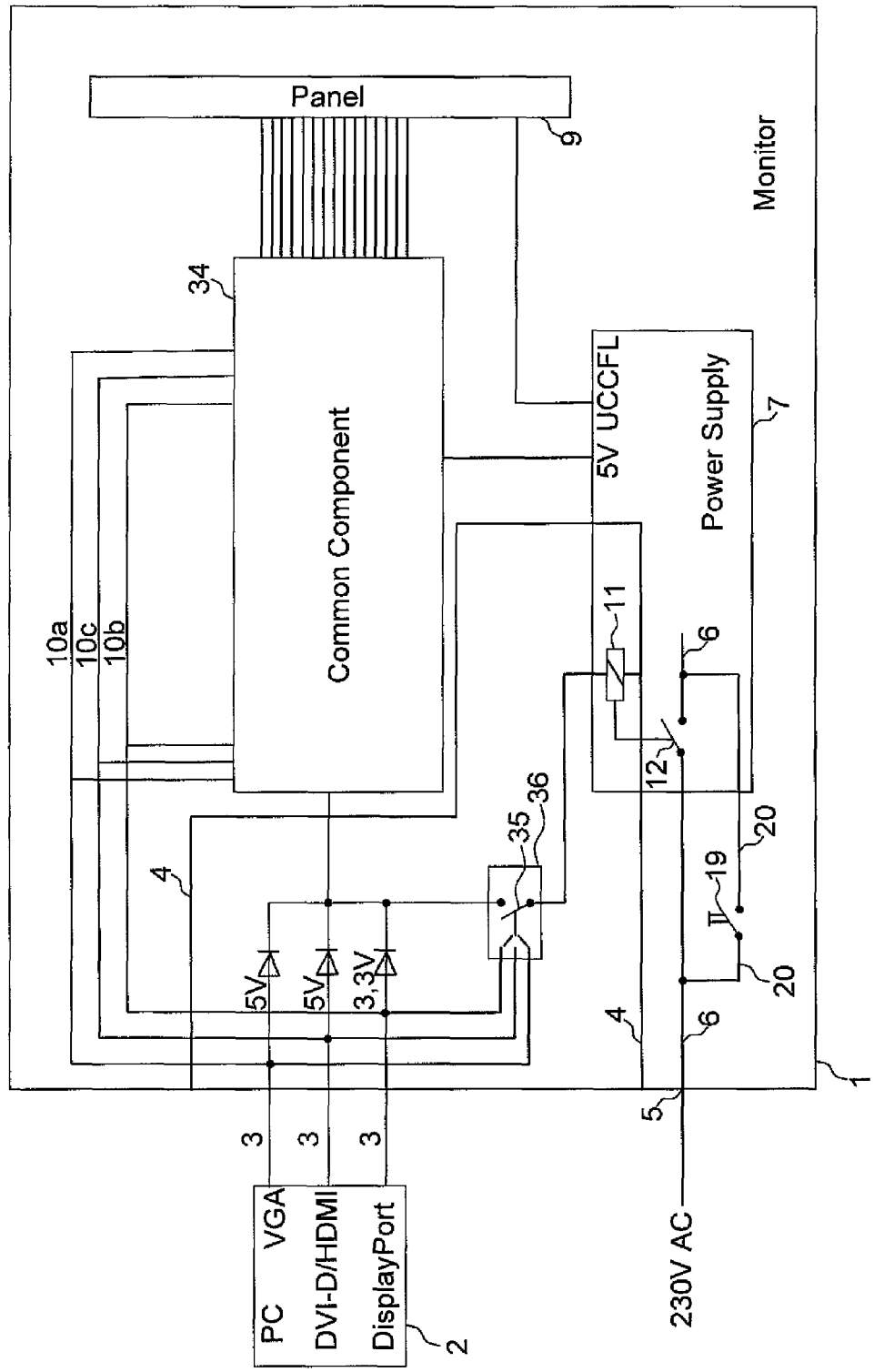

FIG. 9a shows a modification to FIG. 9. In this embodiment, the lines in the standard interface 3 for the transmission of the DDC data (DDC Display Data Channel) are evaluated. The DDC data are transmitted on an I$^2$C bus, wherein the lines SDA (System Data) and SCL (System Clock) are used for controlling a switch 35 in the line connection between the 5 or 3.3 V line of the standard interface 3 and the relay 11. The switch 35 is integrated in a logic component 36, which can also be a component of the microcontroller 31. If the switch 35 is closed, the relay 11 is energized and the switch 12 is likewise closed. In contrast, if the DDC data signal that a standby state is to be assumed, the switch 35 is opened, as a result of which the relay 11 also opens the switch 12.

FIG. 9b shows an embodiment in which the standard interface 3 is constructed as DisplayPort, and LVDS data (LVDS=Low Voltage Differential Signaling) are transmitted directly to the panel 9. The relay 11 is connected directly to the 5 or 3.3 V line of the standard interface 3.

Figure 10:
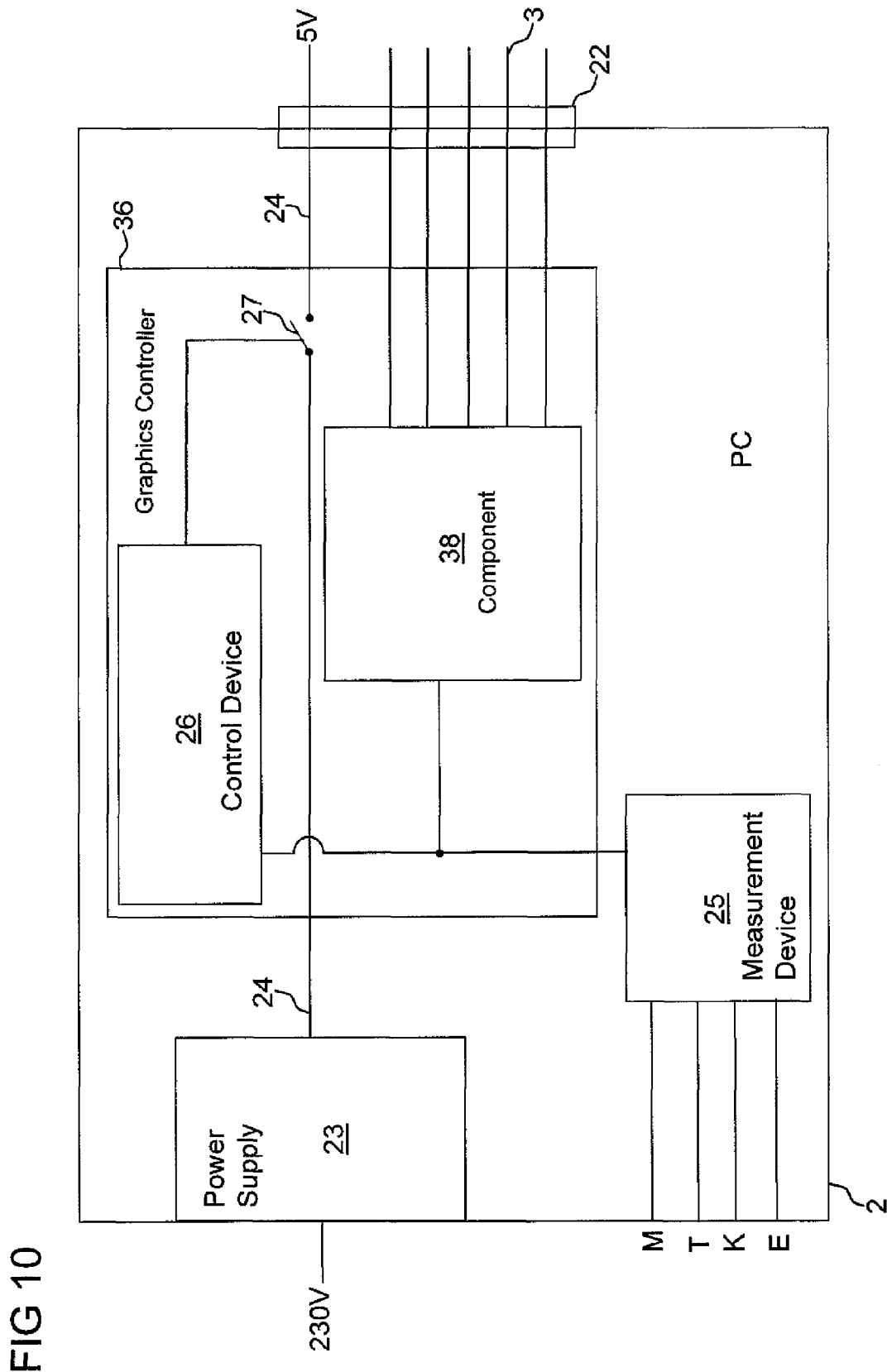

FIG. 10 shows the other electronic device 2 in the form of a computer in schematic representation.

The electronic device 2 has a terminal 22 for the connection lines of a standard interface 3. The standard interface 3 is not specified more exactly in FIG. 10 and can be a VGA or DVI interface or some other standard interface, e.g., an HDMI or DisplayPort interface.

In all cases, the standard interface 3 has a voltage line, as a rule a 5 V or 3.3 V voltage line.

A power supply 23, which can be connected to the mains voltage and which provides direct voltage to terminal 22 via a line 24, is arranged internally in the electronic device 2.

In addition, in the electronic device 2 there is a measurement device 25, which is connected to input devices, for example, a camera K, a mouse M, a keyboard T, or an input device E, and which can measure the time during which, for example, no input is performed, or which can determine by means of the camera whether a user is sitting in front of the monitor. After a certain time of inactivity, which can normally be set in the operating system, the measurement device 25 forwards a signal to a connected control device 26 and this signal causes a switch 27 to be opened in the connection line 24, that is, the line for the 5 or 3.3 V pin of the standard interface 3. For controlling the first electronic device 1 into an energy-saving state, the 5 or 3.3 V line is interrupted by opening the switch 27, as a result of which the evaluation unit 4 in the first electronic device 1 then sets this device into the energy-saving state. The control device 26 and the switch 27 are parts of a graphics controller 36. The graphics controller 36 further includes a component 38, which is used for generating image data and which feeds image data to the standard interface 3.

Alternatively, in the second electronic device 2, instead of the switch 27, the 5 or 3.3V line could also be switched to a low voltage level.

Figure 11:
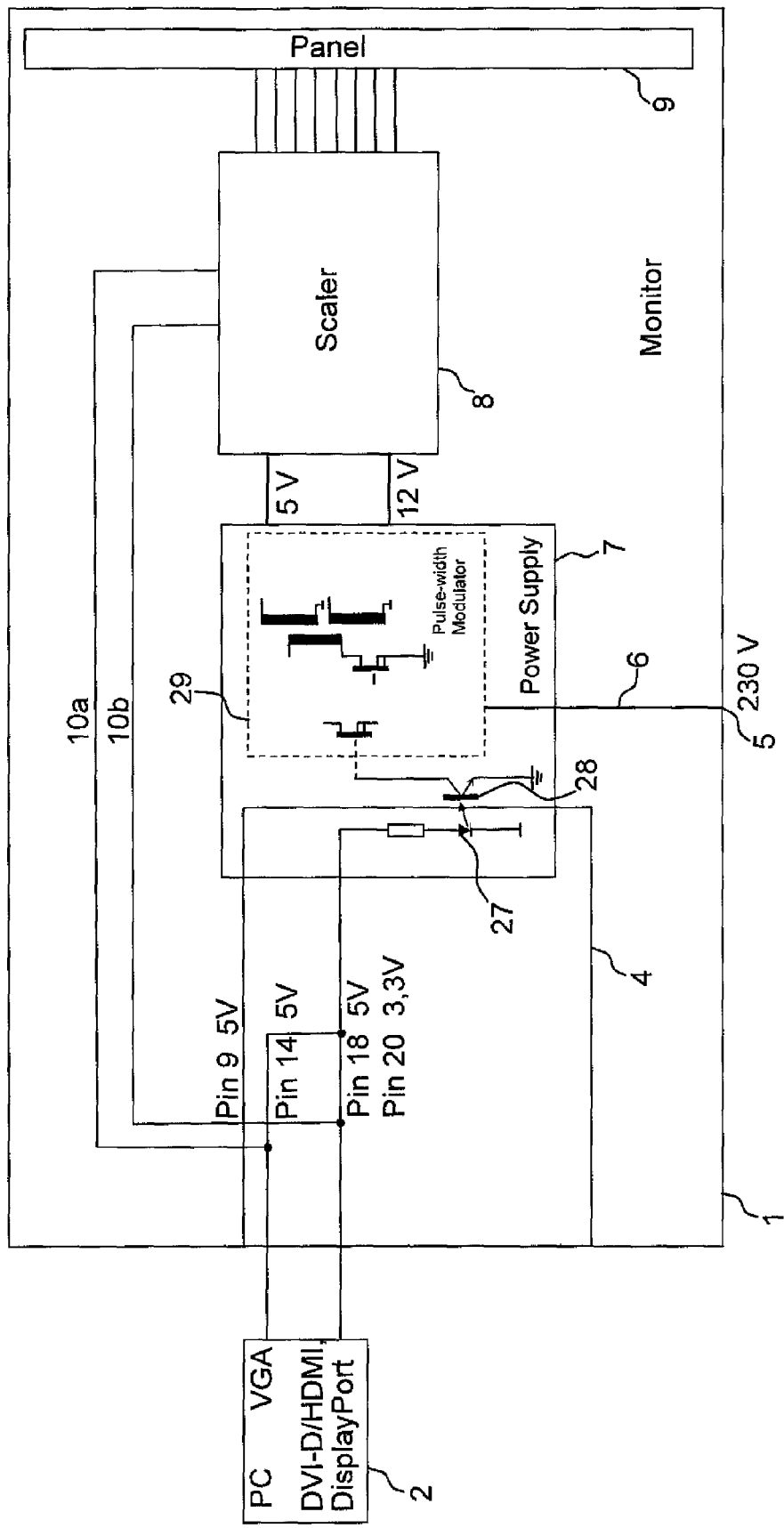

FIG. 11 shows an arrangement made from the first electronic device 1 and the second electronic device 2 in an embodiment similar to FIG. 1, wherein the power supply 7 is turned off not by a switch 12 in the feed line 6 from the mains voltage to the power supply, but instead a simple optical coupling is used for this purpose.

The evaluation unit 4 has a photodiode 27 for this purpose, which is supplied via the 5 or 3.3 V voltage line of the standard interface. The power supply 7 has a corresponding phototransistor 28, which can be controlled via the photodiode 27. In the shown embodiment, for the power supply, the alternating voltage is converted via a pulse-width modulator 29 from an alternating voltage of, for example, 230 V, into a direct voltage of 5 or 12 V. For this purpose, the pulse-width modulator has a rectifier, a chopper, or a transmitter, wherein the phototransistor 28 can turn off the transmitter in the pulse-width modulator 29 for controlling the electronic device 1 into an energy-saving state.

Through this solution, a greatly reduced power consumption in the energy-saving state of <0.05 W is produced from the alternating voltage provided via the terminal 5 or the line 6.

As an alternative to turning off the transmitter, the number of duty cycles in the pulse-width modulator can also be greatly reduced or set to 0 duty cycles.

In the embodiment according to FIG. 11, it becomes clear that the evaluation unit 4 is a functional device and partially overlaps, in this case, in fact with the power supply 7, because parts of the evaluation unit 4 can be arranged in the power supply 7.

Figure 12:
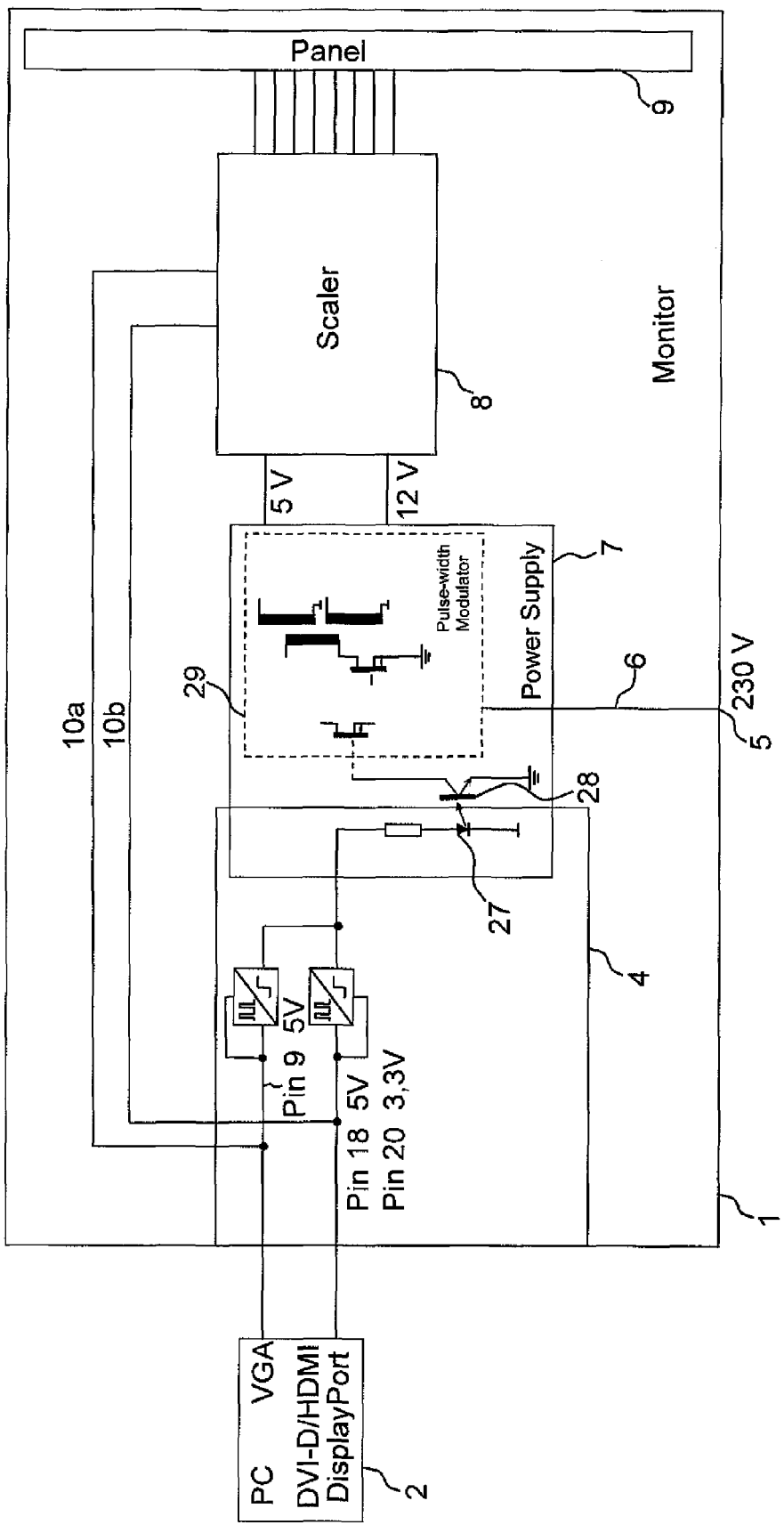

FIG. 12 shows a refinement of FIG. 11, wherein the sync signals in the formation of the standard interface 3 as a VGA interface or the clock signals in the formation of the standard interface 3 as a DVI-D interface are also used or evaluated for controlling the photodiode 27.

Through this formation, it is possible to also turn off the power supply when an energy-saving state is signaled by the second electronic device 2, e.g., by means of the sync signals or the clock signals.

The sync signals or the clock signals from the connection lines of the standard interface can be used not only for control, but the energy from these signals can also be used for powering the evaluation unit 4 at least for the time during which the electronic device 1 is in the energy-saving state.

Figure 13:
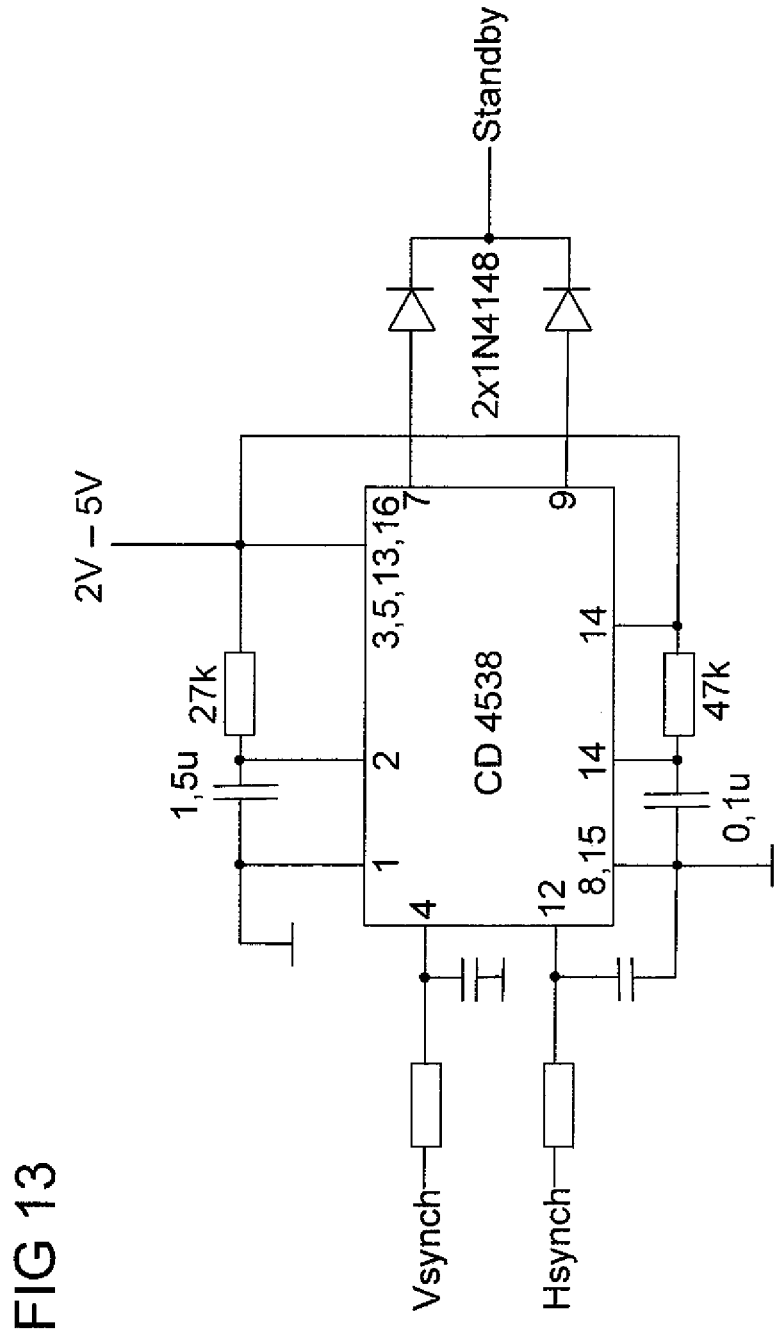

FIG. 13 shows a circuit diagram for an evaluation circuit 4 for evaluating the vertical or horizontal synchronization signals of a standard interface, in order to output the signaling according to the interruption of the VSYNC or HSYNC or both SYNC signal lines, in such a way that the connected device or the connected equipment should cause the control of the electronic device 1 into standby, that is, into the energy-saving state.

In the circuit according to FIG. 13, a so-called timer IC with the product designation CD4538 is provided. This circuit includes two monoflops, wherein the inputs to the pins 4 and 12 can be activated. The pins 7 and 9 are the outputs, which are guided via two diodes to a common standby output. The time characteristics of the monoflops are set by means of external capacitors and resistors, which are dimensioned in the present embodiment with 1.5 μF and 27 kΩ or 0.1 μF and 47 kΩ.

If the VSYNC signal and/or the HSYNC signal are interrupted for a time period that is longer than a time period set by the external circuitry, then a signal indicating this state is generated on the standby output. The two diodes on the outputs 7 and 9 here represent an OR logical connection of the output signals on the pins 7 and 9. A standby signal is thus generated when one of the signals VSYNC or HSYNC or both signals VSYNC and HSYNC are interrupted.

Figure 14:
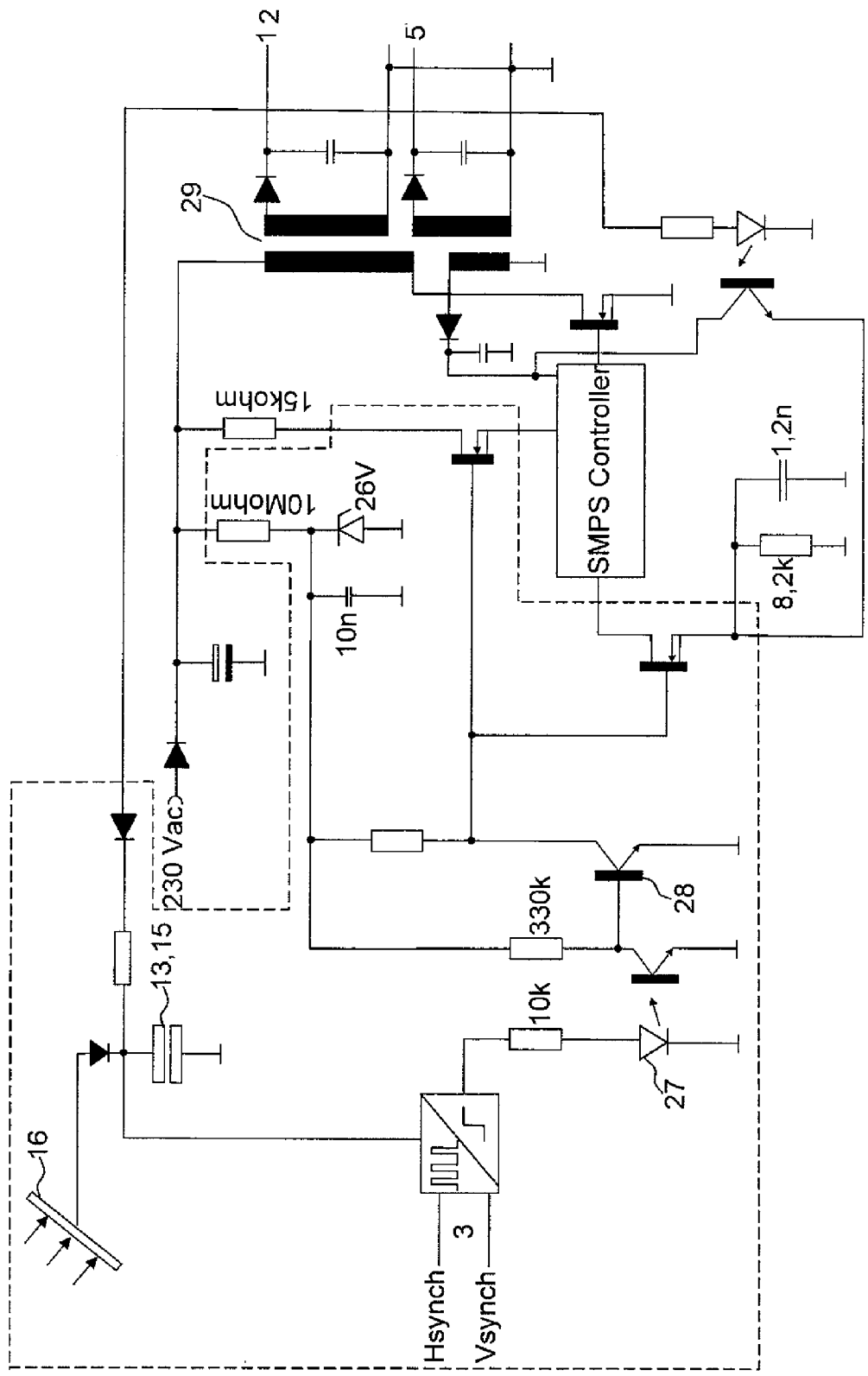
FIG. 14, shows the embodiment according to FIG. 11 in combination with a solar cell and accumulator or a capacitor in the form of a circuit diagram.

FIG. 14 shows a circuit diagram for an embodiment with a solar cell, accumulator and/or capacitor, and evaluation of the sync signals of the standard interface and also optoelectronic coupling with photodiode 27 and phototransistor 28.

The pulse-width modulator 29 of the power supply 7 has a so-called SMPS controller 30 and in the shown circuit it is shown how the power supply 7 can be turned off via the simple optoelectronic coupling with an FET switch 45 on the SMPS controller, in order to set the electronic device 1 into an energy-saving state.

Through a solar cell 16, an accumulator 13, 15 is charged via a diode 48. The accumulator provides the operating voltage for the HSYNC/VSYNC evaluation circuit 4. On the output of the evaluation circuit, as described with reference to FIG. 13, a standby signal is output if HSYNC and/or VSYNC were interrupted for a certain time. This signal is guided to an optocoupler with a light-emitting diode 27 and a phototransistor 28. A potential separation is created by the optocoupler between the low-voltage evaluation circuit and a circuit connected galvanically to the mains voltage. The circuit part operated with mains voltage is powered via a simple auxiliary voltage power supply circuit. The mains voltage of 230 V is rectified, smoothed by a capacitor, and led via a high-impedance resistor, 10 MΩ in the shown embodiment, to a Zener diode with a Zener voltage of 26 V. Of the 230 V alternating voltage, only the part of the positive half wave reaching up to 26 V is kept, which is made available as a 26 V power-supply voltage for operating the circuit. The optocoupler described above prevents feedback of the 230 V alternating voltage onto the HSYNC or VSYNC signal line, for example, if the Zener diode is defective, which could lead to destruction of a connected computer.

A standby signal appearing on the output of the evaluation circuit 4 indicates when the electronic device is to be set into an energy-saving state. This is realized as follows. The pulse-width modulator 29 has a switching transistor in series with a transmitter, by means of which the transmitter can be turned off. For signaling by the evaluation circuit, the transistor 28 is gated. Through the resulting switching-state change of the other transistors in this circuit part, in the end, the switching transistor connected in series to the transmitter is activated and the transmitter is turned off.

The 5 V output on the transmitter is also led via a diode and a resistor to the energy storage device 13, 15 named above, so that in the turned-on state of the device, the energy storage device is also charged by the generated secondary direct voltage and is assigned not just to the solar cell.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. An electronic device, which can assume an operating state and at least one energy-saving state, comprising:
    a power supply configured to be connected to a mains voltage; and
    an evaluation unit configured to control switching of the electronic device between the operating state and the energy-saving state;
    wherein the evaluation unit is connected to the power supply such that the power supply can be turned off by the evaluation unit for assuming the energy-saving state and can be turned on again for assuming the operating state,
    wherein the evaluation unit is supplied in the turned-off state of the power supply with energy from one of a computer and a receiver, which is connected via a standard interface comprising one of a VGA, DVI, HDMI and Display Port to the electronic device, the standard interface comprising one of a 3.3V and 5V voltage line,
    wherein the evaluation unit comprises a relay which is arranged through a switch in a line between the terminal for the mains voltage and the power supply,
    wherein the relay is directly powered by one of the 3.3V and 5V voltage line from the connection lines of the standard interface and is configured to open the switch to place the electronic device into an energy-saving state and to reclose the switch to place the electronic device back to the operating state;
    wherein the connection lines of the standard interface include an HSYNC, VSYNC line and, for the formation as a DVI interface, a clock line, and the evaluation unit evaluates at least one of the HSYNC, the VSYNC line and the clock line of the standard interface, and
    wherein in the electronic device, the power supply is turned off upon switching off the computer or receiver, upon interruption of the voltage line of the standard interface, and upon providing the electronic device with a message specifying the energy saving state into which the electronic device should switch, and if one of a standby mode by interrupting the HSYNC line only and a suspend mode by interrupting the VSYNC line only is signaled by the computer or receiver, the evaluation unit can evaluate evaluates one of said standby mode and suspend mode, and the electronic device switches to an energy-saving state in which no energy is consumed from said mains voltage.

2. The electronic device according to claim 1, wherein the electronic device is a monitor.

3. The electronic device according to claim 1, wherein the evaluation unit is coupled to a measurement device for determining a period of non-use of the electronic device or the other electronic device.

4. The electronic device according to claim 3, wherein the measurement device monitors user actions on the electrical device, and after a time in which no user actions are performed, reports to the evaluation unit that it should switch the electrical device from the operating state into the energy-saving state.

5. The electronic device according to claim 1, comprising a switch arranged to allow the power supply to be manually connected to the mains voltage.

6. The electronic device according to claim 1, wherein the standard interface includes the voltage line, and the evaluation unit evaluates the voltage line of the standard interface.

7. An arrangement comprising the electronic device according to claim 1 and a computer for connecting to the electronic device via a standard interface, which includes the voltage line, wherein the computer comprises a control device configured to interrupt the voltage line for one of controlling the evaluation unit or setting the voltage line to a low voltage level.

8. The electronic device according to claim 1, wherein the evaluation unit includes a plurality of diodes coupled to the standard interface.

9. A method for switching an electronic device between an operating state and at least one energy-saving state, comprising the steps of:
  evaluating with an evaluation unit in the electronic device, a connection line of a standard interface comprising one of a VGA, DVI, HDMI, Display Port and Scart interface;
  connecting the evaluation unit to a power supply such that the power supply can be turned on and off by the evaluation unit; and
  supplying the evaluation unit, when the power supply is turned off with energy from connection lines of the standard interface comprising one of the VGA, DVI, HDMI and Display Port, the standard interface comprising one of a 3.3V and 5V voltage line,
  wherein the evaluation unit comprises a relay which is arranged through a switch in a line between a terminal for a mains voltage and the power supply; and
  wherein the relay is directly powered by one of the 3.3V and 5V voltage line from the connection lines of the standard interface and is configured to open the switch to place the electronic device into an energy-saving state and to reclose the switch to place the electronic device back to the operating state;
  wherein the connection lines of the standard interface include an HSYNC, VSYNC line and, for the formation as a DVI interface, a clock line, and the evaluation unit evaluates at least one of the HSYNC, the VSYNC line and the clock line of the standard interface, and
wherein in the electronic device, the power supply is turned off upon switching off the computer or receiver, upon interruption of the voltage line of the standard interface, and upon providing the electronic device with a message specifying the energy saving state into which the electronic device should switch, and if one of a standby mode by interrupting the HSYNC line only and a suspend mode by interrupting the VSYNC line only is signaled by the computer or receiver, the evaluation unit can evaluate evaluates one of said standby mode and suspend mode, and the electronic device can switch switches to an energy-saving state in which no energy is consumed from said mains voltage.

* * * * *